US012804125B2

(12) United States Patent
Lyubarsky et al.

(10) Patent No.: US 12,804,125 B2
(45) **Date of Patent: *Nov. 17, 2026**

(54) METHODS AND APPARATUS TO RENDER 3D CONTENT WITHIN A MOVEABLE REGION OF DISPLAY SCREEN

(71) Applicant: Texas Instruments Incorporated, Dallas, TX (US)

(72) Inventors: Alexander Lyubarsky, Dallas, TX (US); Kristofer Scott Oberascher, Princeton, TX (US); Samuel Edward Martin, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/977,464

(22) Filed: Dec. 11, 2024

(65) Prior Publication Data

US 2025/0106379 A1 Mar. 27, 2025

Related U.S. Application Data

(63) Continuation of application No. 16/455,256, filed on Jun. 27, 2019, now Pat. No. 12,212,734.

(51) Int. Cl.
*H04N 13/398* (2018.01)
*H04N 9/31* (2006.01)
(Continued)

(52) U.S. Cl.
CPC ......... *H04N 13/398* (2018.05); *H04N 9/3147* (2013.01); *H04N 13/302* (2018.05); *H04N 13/32* (2018.05); *H04N 13/361* (2018.05); *H04N 13/363* (2018.05); *H04N 13/383* (2018.05)

(58) Field of Classification Search
CPC .... H04N 13/398; H04N 13/32; H04N 13/383; H04N 13/302; H04N 13/361; H04N 13/363; H04N 9/3147
See application file for complete search history.

(56) References Cited

U.S. PATENT DOCUMENTS 9,648,308 B2 * 5/2017 Hinnen ................ H04N 13/354
9,710,887 B1 7/2017 Sahlsten
(Continued)

FOREIGN PATENT DOCUMENTS

WO 2018025474 A1 2/2018

OTHER PUBLICATIONS

International Search Report and Written Opinion dated Sep. 17, 2020, PCT Application No. PCT/US2020/040062, 7 pages.

*Primary Examiner* — Sunghyoun Park
(74) *Attorney, Agent, or Firm* — Michael T. Gabrik; Charles F. Koch

(57) ABSTRACT

A method includes projecting, by a first projector, a first image to a first region, the first image having a first angular resolution and a first number of views. The method also includes projecting, by a second projector, a second image to a second region, the second image having a second angular resolution and a second number of views, where the second region is within the first region, the second angular resolution is greater than the first angular resolution, and the second number of views is greater than the first number of views.

20 Claims, 9 Drawing Sheets

(51) Int. Cl.

| | |
|---|---|
| ***H04N 13/302*** | (2018.01) |
| ***H04N 13/32*** | (2018.01) |
| ***H04N 13/361*** | (2018.01) |
| ***H04N 13/363*** | (2018.01) |
| ***H04N 13/383*** | (2018.01) |

(56) References Cited

U.S. PATENT DOCUMENTS

| | | | | |
|---|---|---|---|---|
| 10,136,125 | B2 * | 11/2018 | Yoon | G09G 3/003 |
| 10,594,976 | B1 * | 3/2020 | Lentz | G02B 26/0816 |
| 2002/0167589 | A1 | 11/2002 | Schofield | |
| 2008/0204548 | A1 | 8/2008 | Goulanian | |
| 2011/0316881 | A1 | 12/2011 | Yoshifuji | |
| 2014/0043534 | A1 | 2/2014 | Nakaoka | |
| 2014/0204078 | A1 * | 7/2014 | Chen | H04N 13/376 345/419 |
| 2015/0077526 | A1 * | 3/2015 | Kim | H04N 13/349 348/51 |
| 2017/0142382 | A1 | 5/2017 | Nishioka | |
| 2017/0272739 | A1 | 9/2017 | Kroon | |
| 2017/0280134 | A1 * | 9/2017 | Woods | G06T 7/248 |
| 2017/0353717 | A1 | 12/2017 | Zhou | |
| 2018/0143684 | A1 | 5/2018 | Kuldkepp | |
| 2018/0182480 | A1 | 6/2018 | Ishida | |
| 2018/0275410 | A1 * | 9/2018 | Yeoh | G06F 3/011 |
| 2018/0288387 | A1 | 10/2018 | Somanath | |
| 2019/0075351 | A1 | 3/2019 | Hall | |
| 2019/0187482 | A1 | 6/2019 | Lanman | |
| 2019/0273915 | A1 | 9/2019 | Oberascher | |
| 2019/0279546 | A1 * | 9/2019 | Peuhkurinen | G02B 26/10 |
| 2019/0335146 | A1 | 10/2019 | Hisano | |
| 2019/0335164 | A1 | 10/2019 | Engelen | |
| 2020/0236347 | A1 | 7/2020 | Ollila | |

* cited by examiner

METHODS AND APPARATUS TO RENDER 3D CONTENT WITHIN A MOVEABLE REGION OF DISPLAY SCREEN

CROSS-REFERENCE TO RELATED APPLICATION

This application is a continuation of U.S. patent application Ser. No. 16/455,256 filed Jun. 27, 2019, which Application is hereby incorporated herein by reference in its entirety.

TECHNICAL FIELD

This relates generally to three-dimensional (3D) displays, and, more particularly, to methods and apparatus to render 3D content within a moveable region of a display screen.

BACKGROUND

Some 3D display technologies are able to produce the perception of 3D depth without the use of head mounted displays or other wearable components (e.g., stereoscopic glasses). Display systems capable of producing 3D content without requiring viewers to wear specialized equipment are sometimes referred to as autostereoscopic display systems. Some autostereoscopic technologies use lens arrays or other light redirecting surfaces to produce a light field containing light associated with different (e.g., angularly offset) views of rendered content emanating at different angles from individual lenses in the lens array. The different views correspond to different stereoscopic images of the rendered content that are separately perceived by each eye of a viewer to produce the perception of 3D depth based on binocular vision and the parallax effect.

SUMMARY

In an example, a method includes projecting, by a first projector, a first image to a first region, the first image having a first angular resolution and a first number of views. The method also includes projecting, by a second projector, a second image to a second region, the second image having a second angular resolution and a second number of views, where the second region is within the first region, the second angular resolution is greater than the first angular resolution, and the second number of views is greater than the first number of views.

In an example, an apparatus includes a controller. The controller is configured to produce a first image based on first content; and produce a second image based on second content. The apparatus also includes a first projector coupled to the controller, the first projector configured to project the first image to a first region, the first image having a first angular resolution and a first number of views. Additionally, the apparatus includes a second projector coupled to the controller, the second projector configured to project the second image to a second region, the second image having a second angular resolution and a second number of views, where the second region is within the first region, the second angular resolution is greater than the first angular resolution, and the second number of views is greater than the first number of views.

In an example, a method includes determining, by a controller, a first region of a display and instructing, by the controller, the display to display first content in the first region as a first image having a first angular resolution and a first number of views. The method also includes determining, by the controller, a second region of the display, the second region different than the first region. Additionally, the method includes instructing, by the controller, the display to display second content in the second region as a second image having a second angular resolution a second number of views, the second angular resolution greater than the first angular resolution and the second number of views greater than the first number of views.

BRIEF DESCRIPTION OF THE DRAWINGS

FIG. 4 illustrates three lenses of the lens array of the example autostereoscopic projection system of FIG. 3 to demonstrate different stereoscopic views created as light passes there through.

The figures are not to scale. Instead, the thickness of the layers or regions may be enlarged in the drawings. In general, the same reference numbers will be used throughout the drawing(s) and accompanying written description to refer to the same or like parts.

Descriptors "first," "second," "third," etc. are used herein when identifying multiple elements or components which may be referred to separately. Unless otherwise specified or understood based on their context of use, such descriptors do not impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

The overall pixel density of a flat panel display screen corresponds to the size and associated spacing of pixels across the entire screen. Due to limitations in manufacturing techniques and/or the associated costs of manufacturing, pixel density cannot be increased indefinitely. As such, for a given pixel density, autostereoscopic technologies based on 3D light fields generated using lens arrays involve a tradeoff between spatial resolution and angular resolution. As used herein, spatial resolution corresponds to the density or spacing of pixels associated with any particular view of the 3D image created by an associated light field. Spatial resolution is a function of the number of lenses in a lens array, which is based on the size and/or spacing of the lenses in the lens array. As used herein, angular resolution corresponds to the number of views (e.g., stereoscopic views) created within an associated light field emanating from individual lenses in the lens array. The number of views (indicative of angular resolution) produced by any particular lens in the lens array equals the number of pixels subtended by any particular lens in the lens array. Thus, higher angular resolution (e.g., more views emanating from a single lens) is achieved by associating more pixels with each lens in the lens array of a display screen. Assuming the overall pixel density cannot be increased (e.g., due to manufacturing limitations), higher angular resolution requires increasing the size of the individual lenses in a lens array to cover more pixels. A higher angular resolution is important because it enables the generation of greater depth perception. However, as mentioned above, increasing the angular resolution results in a decrease in the spatial resolution of the display because the pixels associated with any particular view are spaced farther apart. This is schematically shown in the illustrated example of FIG. 1.

Figure 1:
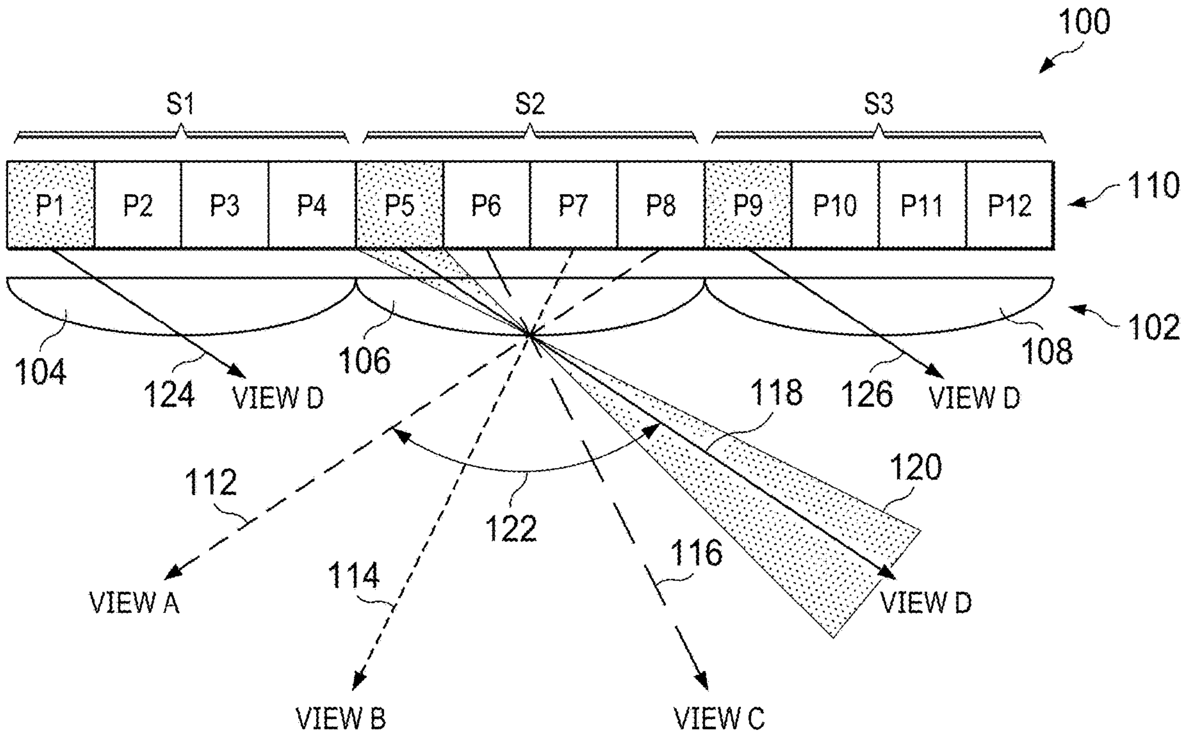
FIG. 1 illustrates a portion of an example autostereoscopic display device that includes a screen panel with a lens array.

FIG. 1 illustrates a portion of an example autostereoscopic flat panel display device 100 that includes a screen panel with a lens array 102. As used herein, a screen panel refers to the front facing surface of a display screen on which content is displayed. In some examples, the lens array 102 may be integrated with the screen panel. In other examples, the lens array 102 may attached to the front surface of the screen panel. In the illustrated example, three separate lenses 104, 106, 108 are shown in front of an array 110 of pixels (labelled P1-P12) associated with a pixel grid for the flat panel display device. In the illustrated example, only some of the pixels of the full pixel grid and some of the lenses of the lens array 102 are shown. In some examples, the pixels and the lenses may number in the hundreds or thousands across the full viewing area of a screen panel of a display screen. As used herein, the viewing area of a screen panel refers to the area of the screen panel that may be illuminated to display content that is viewable by a person looking at the screen panel. For flat panel display devices, the viewable area approximately corresponds to the size of the pixel grid of the flat panel display device.

In the illustrated example of FIG. 1, different ones of the pixels P1-P12 correspond to different spatial groupings of pixels (labelled S1-S3). As used herein, a spatial grouping of pixels corresponds to the set of pixels subtended by a particular lens in a lens array. Thus, as shown in the illustrated example, the first four pixels P1-P4 are subtended by the first lens 104 and, thus, correspond to a first spatial grouping of pixels S1. The next four pixels P5-P8 are subtended by the second lens 106 and, thus, correspond to a second spatial grouping of pixels S2. The last four pixels P9-P12 are subtended by the third lens 108 and, thus, correspond to a third spatial grouping of pixels S3.

The illustrated example of FIG. 1 shows the paths of light 112, 114, 116, 118 emanating from the pixels P5-P8 in the second spatial grouping of pixels S2 and passing through the second lens 106. As shown in the illustrated example, each path of light 112, 114, 116, 118 is angled in a different directions corresponding to a different view of the content represented by the light. In particular, light from the eighth pixel P8 corresponds to a first view (view A), light from the seventh pixel P7 corresponds to a second view (view B), light from the sixth pixel P6 corresponds to a third view (view C), and light from the fifth pixel P5 corresponds to a fourth view (view D). Although the light paths 112, 114, 116, 118 (and corresponding views) are represented by linear arrows, each view may more appropriately be conceptualized as an angular portion (e.g., the shaded area 120 associated with the fifth pixel P5) of the full viewing angle 122 of the display device 100.

With four different pixels P5-P8 in the second spatial grouping of pixels S2, the total number of views created by the resulting light field is four. As mentioned above, the angular resolution of a display screen is a function of the number of views produced by the display screen. More particularly, the angular resolution is defined as the full viewing angle 122 of the display divided by the number of views. Thus, assuming the full viewing angle 122 of the illustrated example is 120 degrees, the angular resolution would be 120 degrees/4 views=30 degrees/view. If the number of pixels in the different spatial groupings of pixels S1-S3 were doubled, the number of views and the corresponding angular resolution would increase proportionately. However, assuming the pixel density of the array 110 of pixels stays the same, doubling the spatial resolution would require the lenses 104, 106, 108 to be twice the size shown in the illustrated example. That is, for example, the first lens 104 would need to extend across all of the pixels from the first pixel P1 to the eighth pixel P8.

While a light field is represented by the light paths 112, 114, 116, 118 in FIG. 1 associated with the second spatial grouping of pixels S2, a similar light field is produced by the first and third lenses 104, 108 directing light from the associated pixels in the first and third spatial groupings of pixels S1, S3 in different directions corresponding to the different views of the display. For purposes of clarity, the light fields associated with the first and third spatial groupings of pixels S1, S3 are not shown in their entireties. However, a path of light 124, 126 for the left-most pixel P1, P9 in each of the first and third spatial groupings of pixels S1, S3 is shown. As shown in the illustrated example, the paths of light 124, 126 for the left-most pixel P1, P9 in each of the first and third spatial groupings of pixels S1, S3 emanate in a similar direction to the path of light 118 emanating from the left-most pixel P5 in the second spatial grouping of pixels S2. Accordingly, the left-most pixels P1, P5, P9 (shaded for purposes of explanation) all correspond to the fourth view (view D) in the illustrated example because the light from the separate pixels would be perceived by an eye of a viewer at a single point in time.

As can be seen from FIG. 1, the particular pixels associated with any particular view are not adjacent to one another within the array 110 of pixels but are separated by other pixels associated with different views. As a result, to enable a particular image to be perceived by a viewer positioned at any particular review, the pixel information for the array 110 of pixels corresponding to rendered content for display on the device 100 corresponds to an interleaved pattern of images associated with the different views. That is, pixel information for view D is spaced apart in the left-most pixels P1, P5, P9 of each spatial grouping of pixels S1-S3 with pixel information for the other views interleaved between the left-most pixels P1, P5, P9. In some examples, the rendered content defining the pixel information for the different pixels associated with the different views corresponds to different stereoscopic images to give the perception of 3D depth when each eye of a viewer perceives a different view of the rendered content.

Although the direction of the paths of light 118, 124, 126 from the shaded pixels P1, P5, P9 are shown emanating in substantially the same direction to be included in the same view, this is because the pixels P1, P5, P9 are associated with lenses 104, 106, 108 that are directly adjacent one another. The angles at which light emanates from different pixels need not be in the same direction to contribute to the same view. For example, light perceived in a viewer's eye from two pixels located on opposites sides of a screen will emanate from the screen at substantially different angles but nevertheless be associated with the same view because the light from both pixels is perceived by the viewer at a single point in time. Thus, the illustrated example of FIG. 1 is for explanation purposes only.

When a viewer's eye is positioned to perceive the light from the shaded pixels P1, P5, P9 (corresponding to view D), the viewer's eye will be unable to perceive the light from any of the other pixels (corresponding to the other views) because such light is emanating in a different direction within the light field. As such, the shaded pixels P1, P5, P9 are the only pixels in the illustrated example that contribute to the content perceived by the viewer when perceiving the fourth view (view D). As such, the pixel density for the fourth view (and/or any other particular view) is one fourth the overall pixel resolution for the display because only one out of every four pixels contributes to the content represented by the light associated with any particular view.

The pixel density for a particular view also corresponds to the spatial resolution of the display device 100. As mentioned above, spatial resolution may alternatively be defined based on the number (and/or the corresponding size and spacing) of the lenses 104, 106, 108 in the lens array 102. As can be seen by reference to FIG. 1, increasing the size of the lenses 104, 106, 108 (to increase the angular resolution by including more pixels in each spatial grouping of pixels for more views) results in a decrease in the number of total lenses and, therefore, the spatial resolution of the display device 100. For example, if the lenses 104, 106, 108 were doubled in size to double the angular resolution, the spatial resolution would be reduced by half. Thus, as demonstrated by the foregoing explanation, there is a tradeoff between angular resolution and spatial resolution.

The tradeoff between angular resolution and spatial resolution becomes less significant if the overall pixel density of a display device is relatively high because then a relatively high number of pixels may be subtended by a single lens of a lens array (for a relatively high angular resolution) while still keeping the individuals lenses of the lens array relatively small (for a relatively high spatial resolution). However, as mentioned above, flat panel displays with high density pixel grids can be cost prohibitive and/or otherwise impracticable to manufacture.

An alternative to a flat panel displays including a grid of high density pixels, is to generate light for the display from a projector (e.g., a rear projector), which can produce images of comparable resolution to flat panel displays. While projected images from projectors may have similar resolutions to flat panel displays, the size of the area illuminated by a projector may be controlled to be significantly smaller than for a flat panel display with a grid of pixels of a fixed size. By producing much smaller images (e.g., based on the magnification of an associated lens and/or the distance of the projector from the display screen), projectors can effectively associate a much greater number of pixels to a particular lens in a lens array than is possible for a pixel grid of a flat panel with the same pixel density as the projector. As a result, the lenses in a lens array associated with such a projector may be smaller to achieve greater spatial resolution while maintaining a relatively high angular resolution. However, a limitation of using projectors in this manner is that the overall image size is relatively small. A larger image may be possible by rendering a complete image on a screen using multiple projectors. However, this approach can be cost prohibitive. Furthermore, rendering images with a high pixel density can require significant bandwidth and processing capacity, particular when a high number of different views (corresponding to a high angular resolution) are being rendered for display across the entire display screen.

Examples disclosed herein enable the rendering of 3D images with both high spatial resolution and high angular resolution while reducing the bandwidth and processing requirements of the system. More particular, examples disclosed herein employ screen panels with lens arrays including relatively small lenses for a relatively high spatial resolution. Further, examples disclosed herein render primary content within a relatively small region of the screen using a first projector to produce a 3D light field associated with a relatively high angular resolution within the region of primary content. A second projector may render secondary content on the rest of the screen (e.g., outside of the small region of primary content illuminated by the first projector) at a much lower angular resolution. In some examples, the secondary content may be 2D content that includes a unitary image rendered for all different views produced by lens array.

As used herein, primary content refers to the content projected onto the viewing area of a screen panel that is the main and/or intended focus of a viewer's gaze when looking at the screen. Further, as used herein, a primary projector refers to a projector that projects light corresponding to primary content. By contrast, as used herein, secondary content refers to content rendered on a display screen that is not primary content (that is, content that is not the main or intended focus of a viewer's gaze) and a secondary projector refers to a projector that projects light corresponding to secondary content.

In some examples, content that is the main and/or intended focus of a viewer's gaze (e.g., primary content) is determined from the content to be rendered and/or metadata associated with the content to be rendered as defined by a content creator. For example, an advertisement may include an image of a product or logo that floats around the viewing area of the screen panel on which the advertisement is being displayed. In some examples, the advertisement creator may define the image of the product or logo as the primary content (e.g., the intended focus of a viewer's gaze of the advertisement) that is to be rendered as a 3D image with high angular resolution for high depth perception to make the product or logo appear to pop out of the screen. In this example, the content in the background of the screen in which the product image is floating corresponds to the secondary content. The fact that the image of the product or logo is rendered with high 3D depth and moving within the screen is likely to draw the attention of a viewer, thereby making the product image the main focus of the viewer's gaze when looking at the screen. In some examples, the advertisement creator may define the particular path the image of the product or logo is to follow as it moves within the viewing area of the screen panel. This motion path of the target content may then serve as the basis to define the location of the region of primary content to which a primary projector projects light to produce the 3D image. In other examples, the product or logo (or any other primary content) may be rendered with high 3D depth without necessarily moving around the viewing area of a screen.

In other examples, content that is the main and/or intended focus of a viewer's gaze (e.g., primary content) is determined by what the viewer chooses to focus on or gaze at. Accordingly, in some examples, eye tracking is implemented to determine a direction of a viewer's gaze and a corresponding location of a screen the viewer is looking at or focused on to determine the region in which a primary projector is to produce primary content. Unlike the product image in the advertising example above, in examples where the primary content is determined by the direction of viewer gaze, the subject matter of the primary content may change as the location of the primary content (corresponding to the direction of viewer gaze) moves around the screen. That is, when the viewer is looking in the upper left hand corner of the screen, the subject matter of the primary content will correspond to whatever content is to be rendered in the upper left hand corner of the screen at that time while content in the lower right hand corner of the screen corresponds to secondary content. If the viewer changes their gaze to look at the lower right hand corner of the screen, the subject matter of the primary content will change to correspond to whatever content is to be rendered in the lower right hand corner of the screen at that time while the content in the upper left hand corner becomes secondary content.

As indicated above, whether the primary content (e.g., the intended and/or main focus of rendered content) is determined based on a viewer's gaze or specified by a content creator, the location of the primary content within the screen may change over time as it follows a motion path defined by the content itself or by the movement of a viewer's gaze. Accordingly, in some examples, a primary projector (that projects light corresponding to primary content) is constructed to change the location of an associated viewing area illuminated by light emitted by the primary projector. In some examples, movement of the projected light from a primary projector relative to the viewing area of a display screen is based on movement of the primary projector itself, movement of an optical element (e.g., a projection lens) associated with the primary projector, and/or movement of one or more galvo mirrors.

As mentioned above, limiting the area of a screen illuminated by a primary projector (e.g., the area of primary content) to a relatively small region of the screen can significantly increase the angular resolution within the region, thereby increasing the perception of 3D depth in the region. Further, if the angular resolution is not increased (or at least increased proportionately less than the reduced size of the small region relative to the full screen size), limiting the region of primary content to a relatively small area can reduce the bandwidth and processing capacity needed to access and/or process content data to render the multiple stereoscopic views for the 3D image that result from the high angular resolution. That is, for equivalent angular resolutions, the smaller the region corresponding to the primary content, the more efficient the display system will be in accessing, processing, and/or rendering the content.

In some examples, the size of the region of primary content is defined to be approximately large enough to fill the field of view of the foveal region of a viewer's eye. The foveal region of the human eye is the location of the eye that corresponds to a central cone of a person's field of view. That is, the subject matter at the center of focus or gaze of a person's eye corresponds to the field of view of the foveal region. Thus, the primary content on a display screen (described above as being the content that is the main or intended focus of a viewer's gaze) may alternatively be defined as the content that is perceived by the foveal region of a viewer's eye. The foveal region has a field of view corresponding to approximately 2 degrees of a person's vision field. As a result, the region of primary content on a screen may be significantly smaller than the full viewing area of a screen, which may cover more than 40 degrees of a person's vision field.

Figure 2:
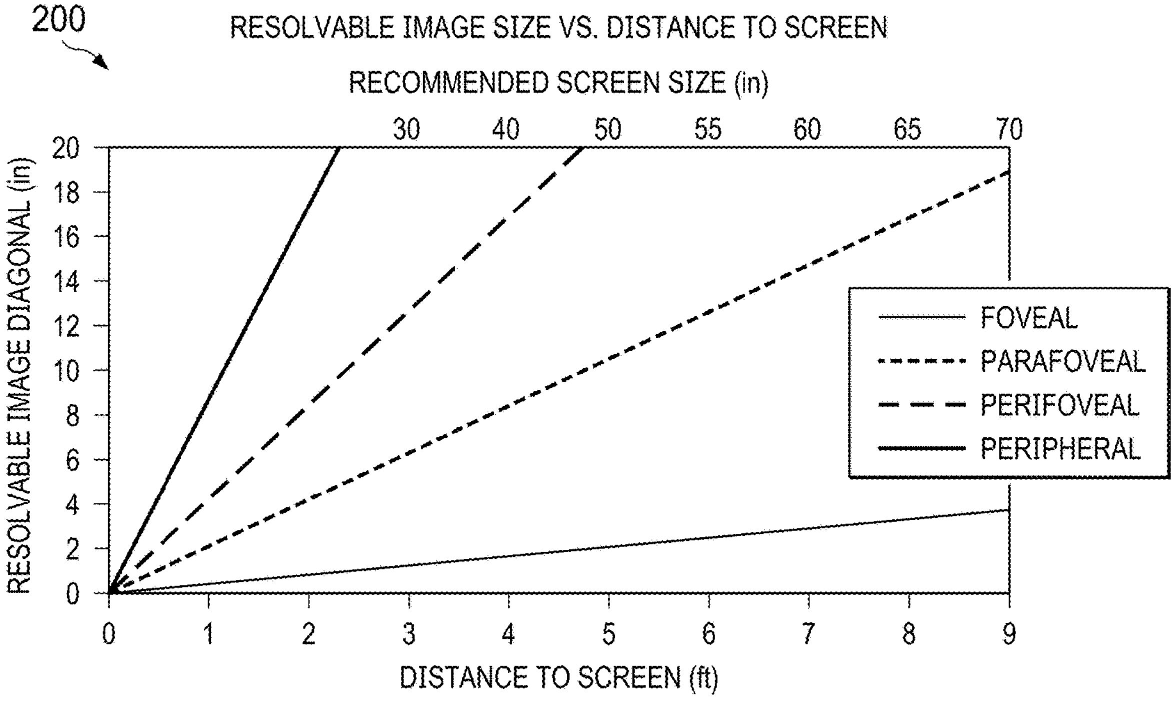
FIG. 2 is a graph illustrating the size of images displayed on a screen that are capable of being resolved by different regions of the human eye at different distances from the screen.

Visual acuity of the human eye is highest within the foveal region and drops relatively quickly for regions of the retina of the eye outside of the foveal region as demonstrated in the graph 200 shown in FIG. 2. In particular, as shown in FIG. 2, for the foveal region of an eye, the size of a resolvable image on a screen positioned three feet away is a little over 1 inch. For the parafoveal region of an eye (which surrounds the foveal region), the size of a resolvable image on a screen positioned three feet away is a little over 6 inches. For the perifoveal region of an eye (which surrounds the parafoveal region), the size of a resolvable image on a screen positioned three feet away is nearly 13 inches. Finally, the size of a resolvable image on a screen positioned three feet away within the peripheral vision of a person is well over 20 inches.

As can be seen from the graph 200 of FIG. 2, the size of the region of primary content does not need to be much bigger than the field of view of the foveal region of a viewer's eye because the eye lacks the visual acuity to perceive significant detail outside of the foveal region. As such, the relatively low resolution of the secondary content is sufficient to fill the rest of the viewing area of the screen surrounding the region of primary content. The exact size of an area on a display screen that corresponds to the field of view of the foveal region depends upon the distance of a viewer from the display screen. Accordingly, in some examples, the size of the region of primary content is determined based on an average or recommended viewer distance from the screen, which is a function of the size of the screen. Example recommended screen sizes for associated distances are also represented in the graph 200 of FIG. 2. The graph 200 may alternatively be viewed as recommended viewer distances for particular screen sizes. For example, at a distance of three feet, a recommended screen size is 30 inches (with a resolvable image for the foveal region corresponding to a little over 1 inch). By contrast, at a distance of nine feet, a recommended screen size is 70 inches (with a resolvable image for the foveal region corresponding to approximately 4 inches). In some examples, the size of the region of primary content may be defined to be somewhat bigger than an area corresponding to the field of view of the foveal region of a viewer's eye at a recommended viewer distance from the screen to account for variability in a particular viewer's distance from the screen. For instance, in some examples, the size of the region of primary content may be within a range from one to four times the area corresponding to the field of view of the foveal region of a viewer's eye at an average viewer distance from the screen. In some examples, the size may be larger than four times the area corresponding to the field of view of the foveal region and may be defined independent of the field of view of the foveal region (e.g., ¼th the size of the screen, ⅛th the size of the screen, and/or any other suitable size). In some examples, the size of the region of primary content may be defined to include an area corresponding to the field of view of both the foveal and parafoveal regions of a viewer's eye at a recommended viewer distance from the screen.

Figure 3:
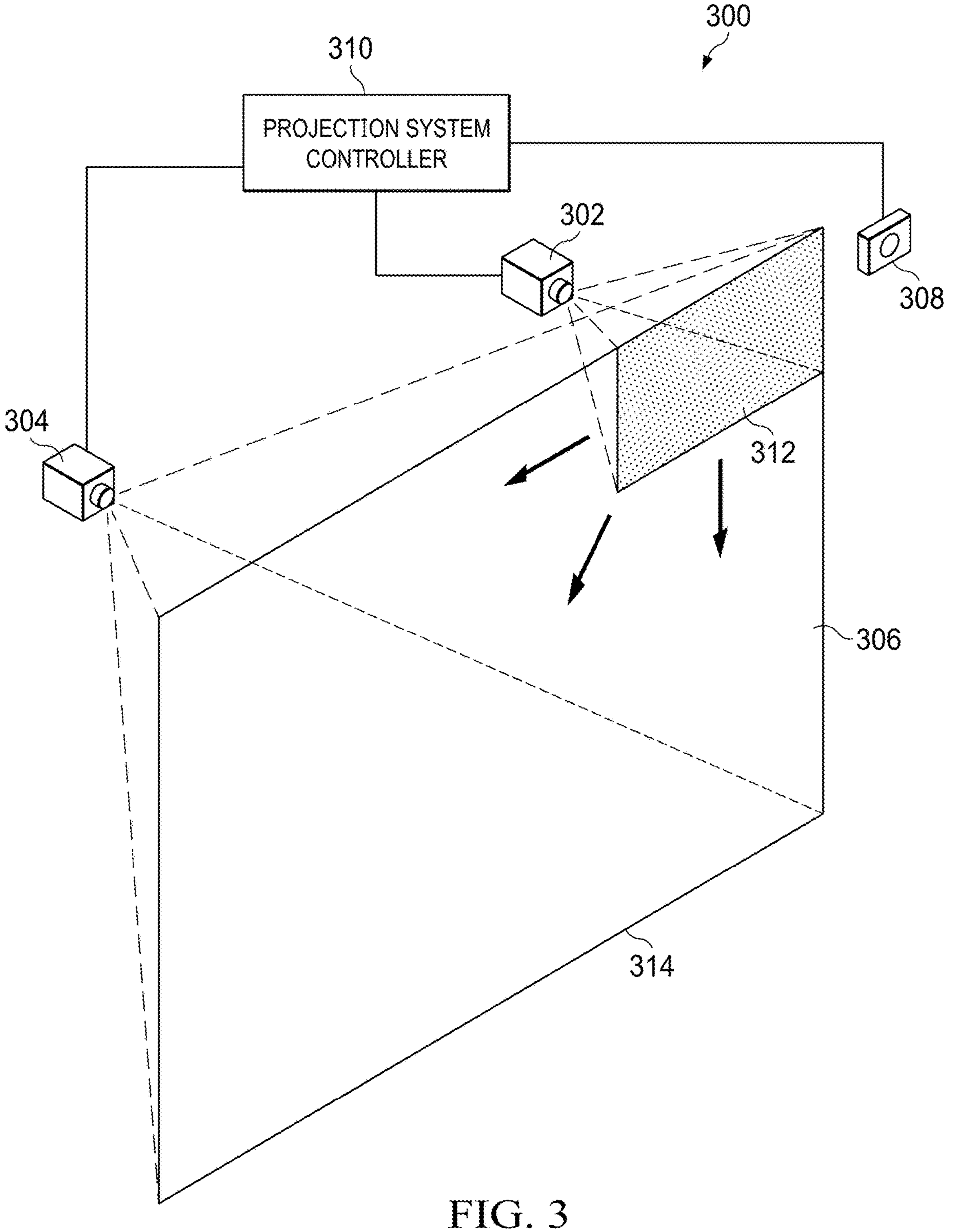
FIG. 3 illustrates an example autostereoscopic projection system constructed in accordance with teachings disclosed herein.

FIG. 3 illustrates an example autostereoscopic projection system 300 constructed in accordance with teachings disclosed herein. The example autostereoscopic projection system 300 includes a primary projector 302, a secondary projector 304, and a screen panel 306 on to which light from the primary and secondary projectors 302, 304 is projected. In some examples, the autostereoscopic projection system 300 may also include one or more eye tracking sensor(s) 308 to detect and monitor the movement of a viewer's gaze as the viewer looks at the screen panel 306. In some examples, the primary projector 302, the secondary projector 304, and the one or more eye tracking sensor(s) 308 are in communication with a projection system controller 310 that processes feedback from the eye tracking sensor(s) and controls the operation of the primary and secondary projectors 302. In some examples, the primary projector 302, the secondary projector 304, the one or more eye tracking sensor(s) 308, and the projection system controller 310 are integrated into a single device with the screen panel 306 (e.g., all carried by a single housing). In other examples, one or more of the primary projector 302, the secondary projector 304, the one or more eye tracking sensor(s) 308, and the projection system controller 310 may be separate from the screen panel 306 and/or separate from one another in separate housing(s). In some examples, the projection system controller 310 is formed by circuitry.

In the illustrated example of FIG. 3, the screen panel 306 is constructed to include a lens array 402 (FIG. 4) to produce a light field from the light projected from the projectors 302, 304 to provide different stereoscopic views of an image to appear in 3D on the screen panel 306. In some examples, the lens array 402 is integral to the screen panel 306. In other examples, the lens array 402 may be separate from and affixed to a surface of the screen panel 306. In some examples, the lens array 402 is a lenticular lens array including cylindrical and/or acylindrical lenses. In some such examples, the lenticular lenses extend vertically to produce horizontal parallax. In other examples, the lenticular lenses are slanted to produce parallax in both the horizontal and vertical directions (e.g., full parallax). In some examples, the lens array 402 is a spherical lens array to produce full parallax. In some examples, the lens array 402 includes aspherical lenses. In some examples, the lens array 402 may be replaced by any other type of light redirecting surface (e.g., diffractive films, metalenses, etc.) capable of generate a suitable light field containing light associated with different views of rendered content (e.g., different stereoscopic images) emanating at different angles from the surface.

As shown in the illustrated example, the primary projector 302 projects light to a region 312 (e.g., the shaded area in the illustrated example of FIG. 3) of the screen panel 306 that is less than the full viewing area 314 of the screen panel 306. As described above, the viewing area refers to the full area of the screen panel 306 that may be illuminated to display content viewable by a person looking at the screen panel 306. In some examples, the light from the primary projector 302 projected onto the region 312 of the screen panel 306 corresponds to primary content that is the main and/or intended focus of a viewer's gaze. In some examples, the size of the region 312 (corresponding to primary content) is significantly smaller than the viewing area 314 of the screen panel but at least as large as an area corresponding to one to four times the field of view of the foveal region of a viewer's eye at an average viewer distance from the screen panel 306. In some examples, the region 312 of primary content may be greater than four times an area corresponding the field of view of the foveal region. In some examples, the size of the region 312 of primary content is controlled by moving the primary projector 302 towards or away from the screen panel 306 (e.g., to adjust the throw of the primary projector 302). Additionally or alternatively, the size of the region 312 may be adjusted by adjusting a zoom lens on the primary projector 302 to increase or decrease the magnification of the projected content.

Although the region 312 of primary content is shown in the illustrated example of FIG. 3 as being generated from a primary projector 302. In other examples, the primary content rendered in the region 312 shown in FIG. 2 may alternatively be generated a different type of light sources such as, for example, a flat panel display having a size corresponding to the area of the region 312. In such examples, the flat panel display may be implementing using any suitable display technology (e.g., liquid crystal on silicon (LCoS), liquid crystal display (LCD), organic light-emitting diode (OLED), microLED, etc.). As described above, the pixel pitch (based on image size) and corresponding angular resolution (view count) can be adjusted for a projector by adjusting the distance of the projector and/or the magnification of the projector lens. By contrast, the pixel pitch and corresponding angular resolution of a flat panel display is fixed. However, implementing teachings disclosed herein with a relatively high-resolution flat panel display of a relatively small size (corresponding to the region 312) can still save considerably costs relative to implementing the full area of the screen panel 306 with a flat panel display.

In the illustrated example of FIG. 3, the secondary projector 304 projects light to a second region of the screen panel 306. In some examples, the secondary projector 304 projects light to substantially all (e.g., greater than 95%) of the viewing area 314. In other examples, the secondary projector 304 projects light to substantially all of the viewing area 314 except for the region 312 that is illuminated by light from the primary projector 302. In some examples, the light from the secondary projector 304 projected onto the region of the screen panel 306 surrounding the region 312 corresponds to secondary content that remains within the periphery of a viewer's main focus or gaze on the screen.

Inasmuch as the light from the secondary projector 304 corresponds to secondary content, in some examples, the light from the secondary projector 304 is projected onto the screen panel at a lower apparent angular resolution than light from the primary projector 302. In some such examples, the primary and secondary projectors 302, 304 may have a similar native pixel density. However, the apparent angular resolution of the light from the primary projector 302 may be much higher than the light from the secondary projector 304 because the size of the region 312 illuminated by the primary projector 302 is much smaller than the remainder of the viewing area 314 of the screen panel 306 illuminated by the secondary projector 304. In other examples, the primary projector 302 may have a higher native pixel density than the secondary projector 304 to facilitate the rendering of content at higher resolutions.

The differences in resolution produced by the primary and secondary projectors 302, 304 correspond to angular resolution because the spatial resolution of the autostereoscopic projection system 300 is fixed according to the size and spacing of the individual lenses in the lens array 402. As described above, angular resolution corresponds to the number of views produced by the light field emanating from each lens in the lens array 402, which equals the number of pixels subtended by each lens in the lens array 402. The different views are created by rendering the different views in an interleaved pattern so that light emanating from the projectors 302, 304 corresponding to different pixels associated with a particular view is directed by the lens array 402 to a particular location where a viewer is able to perceive the light from all the pixels associated with the particular view but not the light associated with other views.

In some examples, the different views in the patterned rendering for the secondary content (to be projected by the secondary projector 304) are interleaved in a courser manner corresponding to the lower angular resolution than the interleaved pattern of views for the primary content (to be projected by the primary projector 302). As a result, the number of views produced by the secondary projector 304 is less than the number of views produced by the primary projector 302. As such, the secondary content will provide less 3D depth perception than the primary content. This is not of particular concern because a viewer will be focused on (e.g., gazing at) the primary content, such that the secondary content will be in the periphery of the viewer's field of view where visual acuity is much lower as discussed above in connection with FIG. 2. Furthermore, the lower angular resolution reduces the processing requirements of the system 300 to generate the patterned rendering of the secondary content as compared with the primary content. In some examples, to further reduce processing requirements, the light from the secondary projector 304 may correspond to a unitary rendering of primary content that contains only a single view (e.g., not patterned rendering of different interleaved views). In such examples, the secondary content would not provide any depth perception based on the principle of parallax but would correspond to a 2D image.

Figure 4:
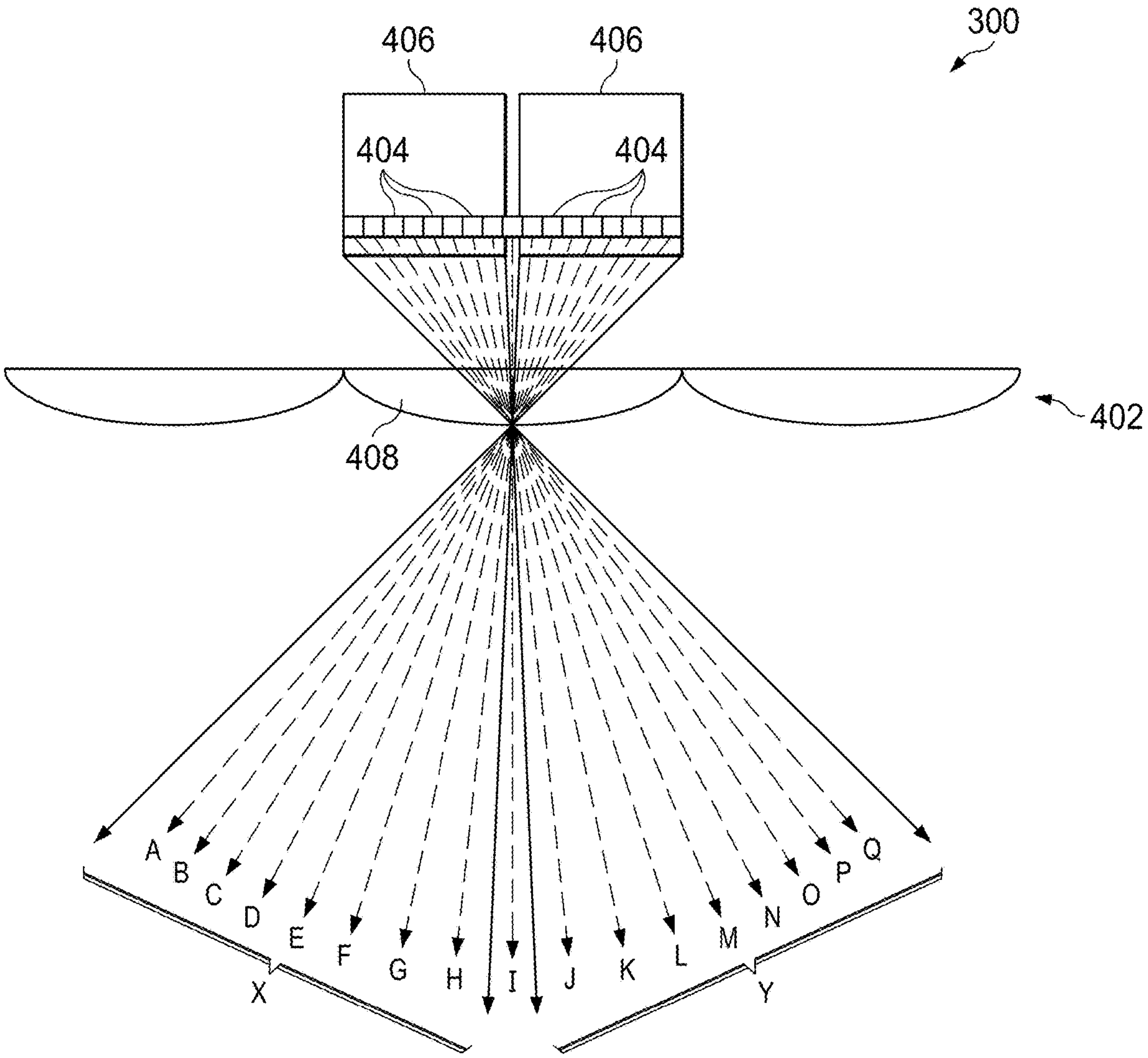

FIG. 4 illustrates three lenses of the lens array 402 of the example autostereoscopic projection system 300 of FIG. 3 to illustrate the different views created by light passing through the lens array 402. In this particular example, the primary projector 302 projects light associated with seventeen different pixels (represented by the white boxes 404) at each lens in the lens array 402 to produce seventeen different views (represented by arrows with broken lines and labelled from A to Q). By contrast, the secondary projector 304 projects light associated with two different pixels (represented by the shaded boxes 406) at each lens in the lens array 402 to produce two different views (labelled X and Y). The number of pixels 404, 406 associated with the primary and secondary projectors 302, 304 that emanate light directed toward a single lens shown in FIG. 4 is for illustration only. In other examples, there may be any suitable number of pixels associated with the primary projector 302 and any suitable number of pixels associated with the secondary projector 304.

For purposes of clarity, only the paths of light from the pixels 404, 406 projected toward the central lens 408 in the illustrated example are shown, but similar paths of light from other pixels may also be directed through the other lens of the lens array 402. Further, although paths of light emanating from the pixels 404, 406 associated with both the primary and secondary projectors 302, 304 are shown in FIG. 4, this is for purposes of explanation. In some examples, when the pixels 404 associated with the primary projector 302 are projecting light toward a particular lens (e.g., the central lens 408 in FIG. 4), the corresponding pixels 406 associated with the secondary projector 304 are turned off to not project light. Similarly, in some examples, when the pixels 404 associated with the primary projector 302 are not projecting light toward a particular lens (e.g., the central lens 408 in FIG. 4), the corresponding pixels 406 associated with the primary projector 302 are turned on to project light. Further, although the light emanating from the pixels 406 associated with the secondary projector 304 are represented as corresponding to two different views (X and Y), in some examples, both pixels 406 may include the same content such that view X and view Y effectively correspond to a single view. In such examples, the content would correspond to a 2D image, without 3D depth perception.

As represented by the arrows in the illustrated example of FIG. 3, the region 312 corresponding to the primary content projected onto the screen panel 306 may move within the viewing area 314 of the screen panel 306. In some examples, the direction and/or speed of movement of the region 312 is determined in substantially real-time based on feedback from the one or more eye tracking sensor(s) 308 monitoring the gaze of a viewer. Additionally or alternatively, the motion path followed by the region 312 may be defined based on the content being rendered and/or metadata associated with the content as defined by the content creator. In some examples, movement of the region 312 is accomplished by moving the primary projector 302 relative to the screen panel 306 and/or mechanically moving other components that redirect the light emanating from the primary projector 302. More particularly, FIGS. 5-8 illustrate different mechanical mechanisms to control movement of the region 312 of primary content projected onto the screen panel 306 of the example autostereoscopic projection system 300 of FIG. 3.

Figure 5:
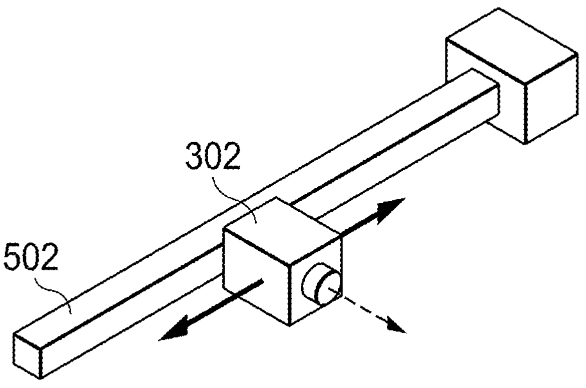
FIG. 5 illustrates example mechanical mechanisms to control movement of the region of primary content projected onto the screen of the example autostereoscopic projection system of FIG. 3.

FIG. 5 illustrates the example primary projector 302 mounted on a linear rail 502 to enable movement of the projector 302 along the rail. In the illustrated example of FIG. 5, the linear rail 502 extends horizontally to enable movement of the primary projector 302 in the horizontal direction. In other examples, the linear rail may be oriented vertically and/or at any other angle to enable movement of the primary projector 302 along the corresponding direction. In some examples, the primary projector 302 may be mounted to a system of horizontal and vertical rails to enable movement of the projector 302 in two dimensions. In some examples, the mechanical actuation of the linear rail 502 is controlled by the projection system controller 310.

Figure 6:
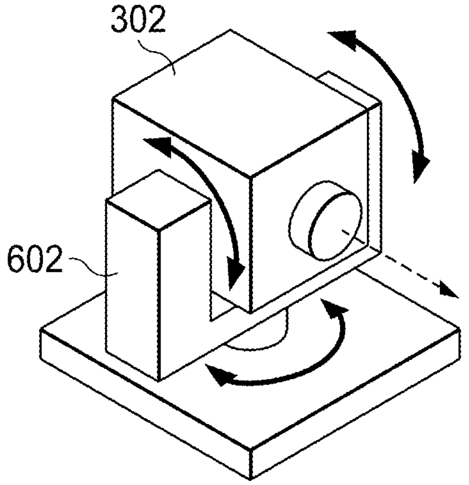
FIG. 6 illustrates another example mechanical mechanisms to control movement of the region of primary content projected onto the screen of the example autostereoscopic projection system of FIG. 3.

FIG. 6 illustrates an alternative implementation with the example primary projector 302 mounted on a motorized gimbal 602 to enable the rotational movement of the projector 302 relative to the screen panel 306. The example implementation of the motorized gimbal 602 of FIG. 6 has an advantage over the linear rail 502 of the example of FIG. 5 because much less movement of the primary projector 302 in the example of FIG. 6 is required to cause the region 312 of primary content to move across the full width and/or height of the viewing area 314 of the screen panel 306. On the other hand, the example implementation of FIG. 5 is beneficial because there is no keystone distortion in the image projected onto the screen panel 306 from the primary projector 302 as it moves along the linear rail 502. By contrast, the image projected from the primary projector 302 mounted to the gimbal 602 in the illustrated example of FIG. 6 will result in keystone distortion that will need to be electronically corrected in the content rendering as the region 312 of primary content moves from place to place within the viewing area 314 of the screen panel 306. In some examples, the motorized gimbal 602 is controlled by the projection system controller 310.

Figure 7:
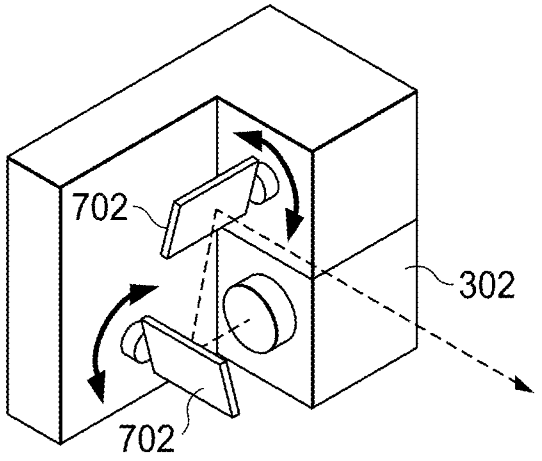
FIG. 7 illustrates another example mechanical mechanisms to control movement of the region of primary content projected onto the screen of the example autostereoscopic projection system of FIG. 3.

Unlike FIGS. 5 and 6 that include mechanical components that cause the primary projector 302 to move relative to the screen panel 306, the primary projector 302 constructed in accordance with the illustrated example of FIG. 7 does not involve movement of the primary projector 302. Rather, FIG. 7 illustrates the primary projector mounted in operational relationship with galvo (galvanometer) mirrors 702 that are mechanically actuated to redirected light from the projector 302 to any desired location within the viewing area 314. Although two galvo mirrors 702 are shown in the illustrated example, in other examples, there may be more or fewer mirrors 702 than shown in FIG. 7. Implementation of the galvo mirrors 702 will result in keystone distortion as the projected image from the projector 302 is reflected to different portions of the view area 314 of the screen panel 306. Accordingly, in such examples, the projection system controller 310 may adjust the content rendered for projection by the primary projector 302 to account for any distortion. In some examples, the galvo mirrors 702 are controlled by the projection system controller 310.

Figure 8:
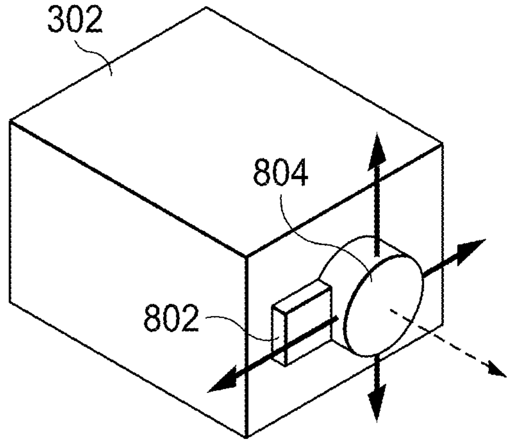
FIG. 8 illustrates another example mechanical mechanisms to control movement of the region of primary content projected onto the screen of the example autostereoscopic projection system of FIG. 3.

In the illustrated example of FIG. 8, the primary projector 302 does not need to move relative to the screen panel 306 to cause the projected light to move along the screen panel. Rather, in this example implementation, one or more mechanical actuators 802 operate to move the projection lens 804 of the projector 302. An advantage of the example implementation of FIG. 8 is that, in addition to the primary projector 302 not having to move, the image projected by the projector does not result in any distortion as it moves across the screen panel 306 so long as the projection lens 804 is large enough to accommodate the shift because the change in location of the projected image corresponding to the region 312 of primary content is controlled directly by a change in position of the projection lens 804. In some examples, the one or more mechanical actuators 802 are controlled by the projection system controller 310.

The different stereoscopic views for a 3D image produced from a light field created by the lens array 402 is accomplished by the projection system controller 310 rendering the different views for projection by a projector using an interleaved pattern corresponding to the size and spacing of the lenses in the lens array 402. Furthermore, the patterned rendering of the different views also depends upon the position of particular pixels associated with each view of the projected image relative to the position of the lenses in the lens array 402 through which the projected image passes. As described above, the image projected by the primary projector 302 (which includes a patterned rendering of multiple interleaved views) is located in the region 312 of primary content, which may move around the viewing area 314 of the screen panel 306 according to a predefined motion path or a motion path corresponding to movement of a viewer's gaze. As a result, the relative position of any given pixel of the projector to any given lens in the lens array 402 changes as the region 312 moves. Accordingly, in some examples, the projection system controller 310 updates the pattern used to interleave the different views into a rendering that is projected by the primary projector 302 as demonstrated in FIGS. 9-11.

Figure 9:
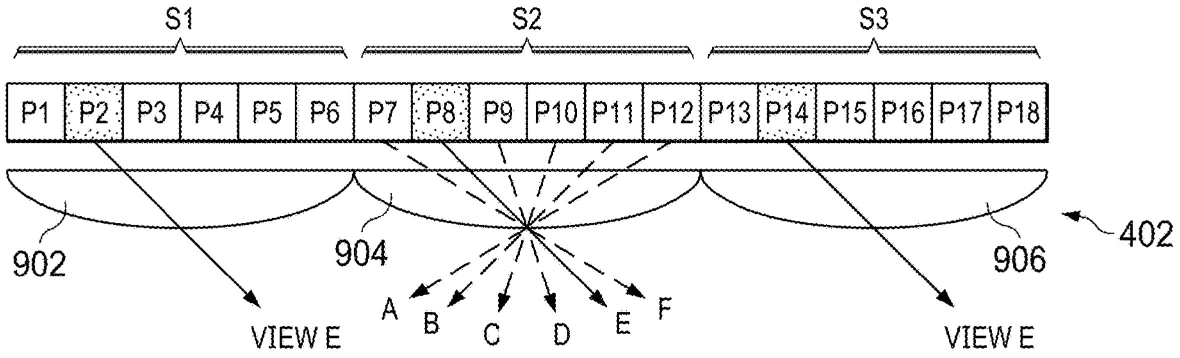
FIGS. 9-11 illustrate positional relationships between pixels of the primary projector and the lens array at three successive points in time as the region of primary content moves across the screen panel of the example autostereoscopic projection system of FIG. 3.
Figure 10:
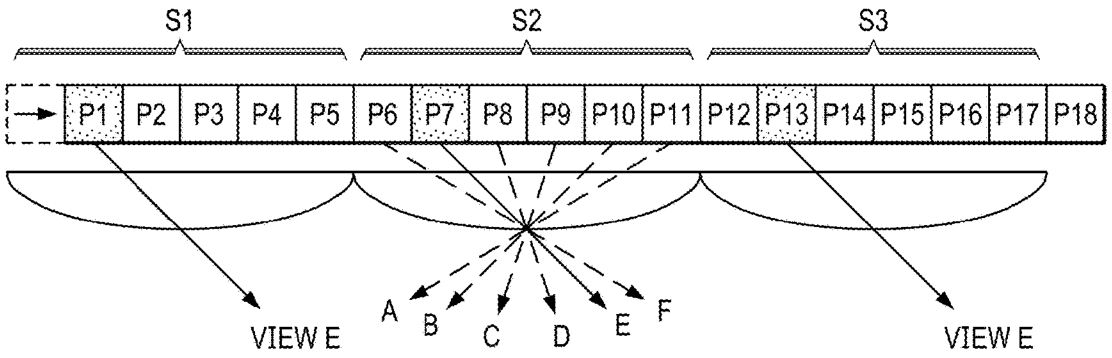
Figure 11:
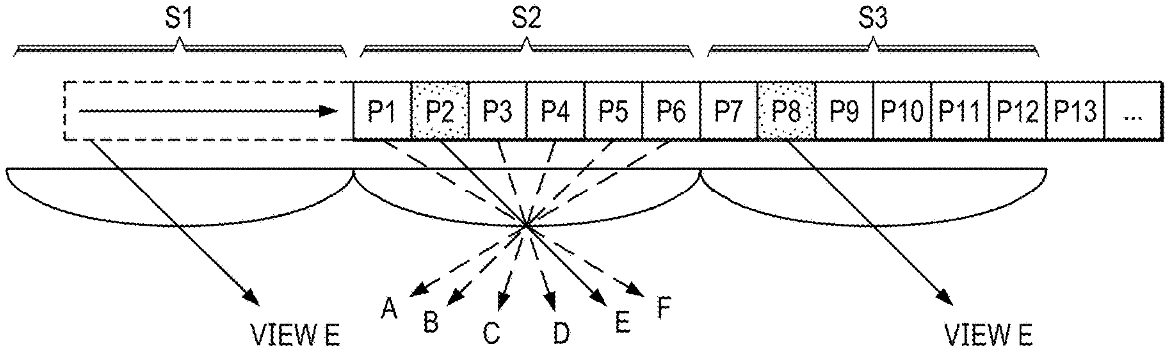

FIGS. 9-11 illustrate the positional relationship between pixels of the primary projector 302 and lenses of the lens array 402 at three successive points in time as the region 312 of primary content moves across the screen panel 306 of the example autostereoscopic projection system 300 of FIG. 3. More particularly, FIG. 9 illustrates example pixels P1-P18 associated with the primary projector 302 projecting an image onto lenses 902, 904, 906 of the lens array 402. In this example, six different pixels are associated with each lens 902, 904, 906, thereby resulting in six different views (labelled A through F) generated in the light field created by the lens array 402. Thus, in the illustrated example of FIG. 9, the first six pixels P1-P6 correspond to a first spatial grouping of pixels S1 associated with the first lens 902, the next six pixels P7-P12 correspond to a second spatial grouping of pixels S2 associated with the second lens 904, and the final six pixels P13-P18 correspond to a third spatial grouping of pixels S3 associated with the third lens 906.

For purposes of clarity and explanation, only the light corresponding to view E (represented by the arrows with a solid line) of the six different views is shown in connection with the first and third lenses 902, 906. Further, for purposes of explanation, the pixels associated with the primary projector 302 that generate the light corresponding to view E in the illustrated example are identified by shading. Thus, at the point in time represented by FIG. 9, the second, eighth, and fourteenth pixels P2, P8, P14 correspond to view E with the other views interleaved there between in connection with the other pixels shown in the illustrated example.

FIG. 10 illustrates the position of the example pixels P1-P18 relative to the lenses 902, 904, 906 at a point in time after the time represented in FIG. 9. As shown in the illustrated example, the pixels P1-P18 have shifted one pixel spacing to the right based on movement of the region 312 of primary content (determined based on movement of the viewer's gaze or defined by the rendered content itself). As a result, only the first five pixels P1-P5 now correspond to the first spatial grouping of pixels S1, while the next sixth pixels P6-P11 correspond to the second spatial grouping of pixels S2, and the next sixth pixels P12-P17 correspond to the third spatial grouping of pixels S3. The eighteenth pixel P18 has shifted out of the third spatial grouping of pixels S3 such that the pixel would be in a new grouping corresponding to the next adjacent lens in the lens array 402. Although the pixels P1-P18 have shifted relative to the lens array 402, the location at which a person may perceive view E has not changed. That is, the angle or direction of each view of a 3D image produced by the autostereoscopic projection system 300 is defined by the lens array 402 and not the light associated with particular pixels of the primary projector 302. As a result, while the second, eighth, and fourteenth pixels P2, P8, P14 were associated with view E in FIG. 9, at the point in time represented by FIG. 10, the first, seventh, and thirteenth pixel P1, P7, P13 are associated with view E. Thus, in some examples, the projection system controller 310 updates or regenerates the patterned rendering of the different views to be interleaved appropriately to maintain the proper content to be perceived by a viewer from view E (and all other views).

FIG. 11 illustrates the position of the example pixels P1-P18 relative to the lenses 902, 904, 906 at a point in time after the time represented in FIG. 10. As shown in the illustrated example of FIG. 11, the pixels have shifted farther to the right so that the first pixel P1 is in the same position relative to the second lens 904 as it was relative to the first lens 902 at the point in time represented in FIG. 9. As a result, the second and eighth pixels P1, P8 again correspond to view E in the illustrated example. Although the second and eighth pixels P1, P8 correspond to view E, the content represented by the pixels P1, P8 in FIG. 9 (e.g., the particular pixel information) may not necessarily be the same because the pixels P1, P8 corresponding to a different location of the screen panel 306.

Figure 12:
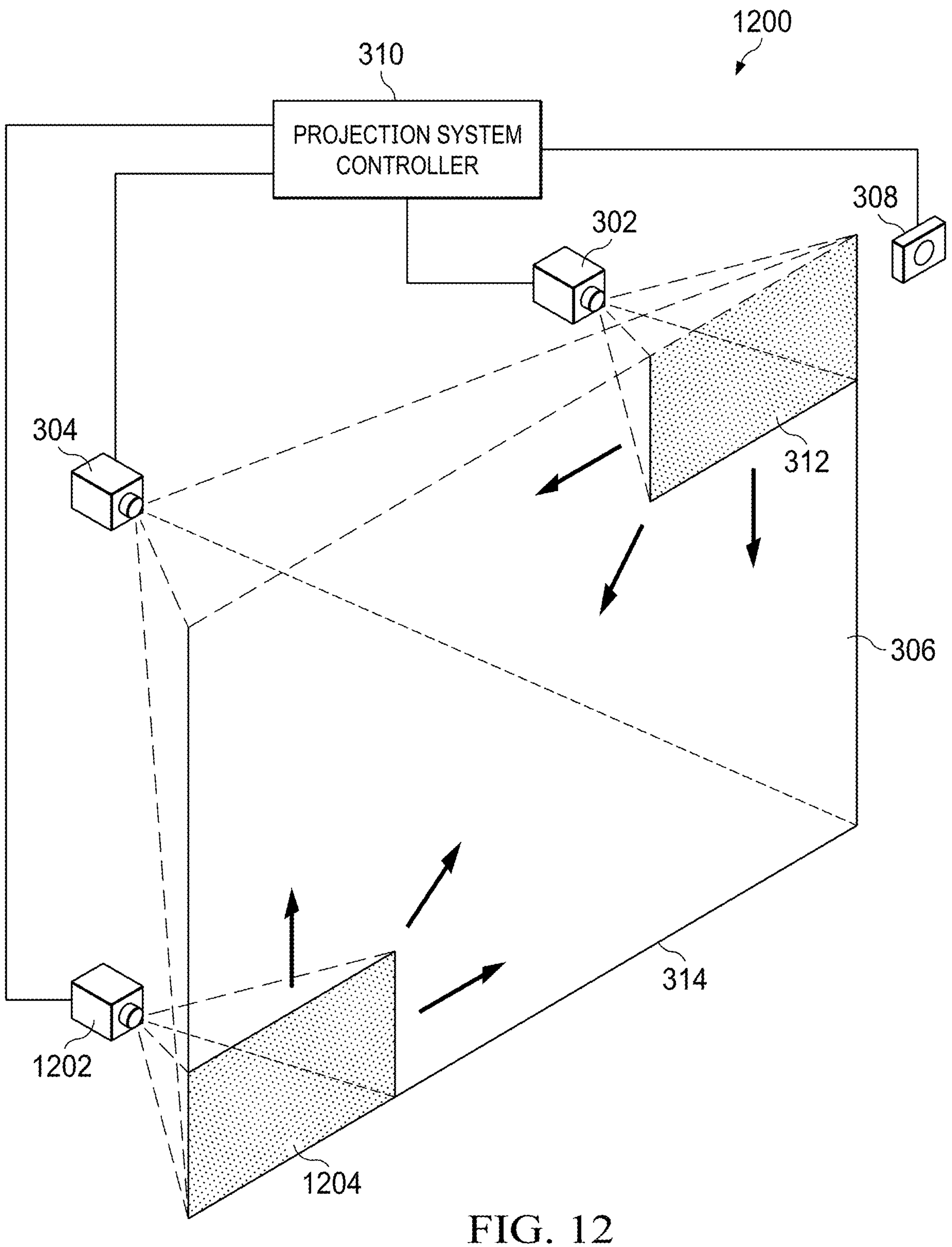
FIG. 12 illustrates another example autostereoscopic projection system constructed in accordance with teachings disclosed herein.

FIG. 12 illustrates another example autostereoscopic projection system 1200 constructed in accordance with teachings disclosed herein. The example projection system 1200 of FIG. 12 is substantially the same as the projection system 300 of FIG. 3 with a similar primary projector 302 to project an image to a region 312 of primary content, a similar secondary projector 304, a similar display screen 306 having a similar viewing area 314, a similar eye tracking sensor 308, and a similar projection system controller 310. However, in contrast with the example projection system 300 of FIG. 3, the example projection system 1200 of FIG. 12 includes a second primary projector 1202 to project an image to a second region 1204 of primary content.

In some examples, both primary projectors 302, 1202 project images at substantially the same time to produce two separate high resolution light fields for images with a high 3D depth perception. As used herein, "substantially the same time" means within +/−1 second. In some such, examples, the movement of the regions 312, 1204 may be independent of one another. In this manner, high quality 3D images may be rendered on the screen panel 306 based on the direction of gaze of two separate viewers. For example, the projection system controller 310 may control the first primary projector 302 to project light for the first region 312 that follows a first motion path corresponding to the gaze of a first viewer and control the second primary projector 1202 to project light for the second region 1204 that follows a second motion path corresponding to the gaze of a second viewer.

In some examples, only one of the primary projectors 302, 1202 may project light at any given point in time. In some such examples, the light from the first primary projector 302 is limited or confined to a first portion of the viewing area 314 (e.g., a first half) of the screen panel 306 and the light from the second primary projector 1202 is limited or confined to a second portion of the viewing area 314 (e.g., a second half). In such examples, the motion paths of for the separate regions 312, 1204 of primary content may correspond to separate segments of a full motion path that extends across the first and second portions of the viewing area 314. That is, while content to be rendered in 3D as the main or intended focus of a viewer's gaze (e.g., primary content) is in the first portion of the viewing area, the first primary projector 302 generates the light used to project the patterned rendering of the multiple views for the 3D image. If the content to be rendered as the main or intended focus of the viewer's gaze moves to the second portion, the second primary projector 302 will takeover in generating the light used to produce the 3D image.

Although two primary projectors 302, 1202 are shown in the illustrated example of FIG. 12, in other examples, more than two primary projectors may be implemented. Further, in some examples, more than one secondary projector may be implemented to project secondary content onto portions of the view area 314 surrounding the region(s) 312, 1204 of primary content. In other examples, the secondary projector 304 may be omitted such that the only content that is rendered is the primary content projected by the primary projector(s) 302, 1202.

Figure 13:
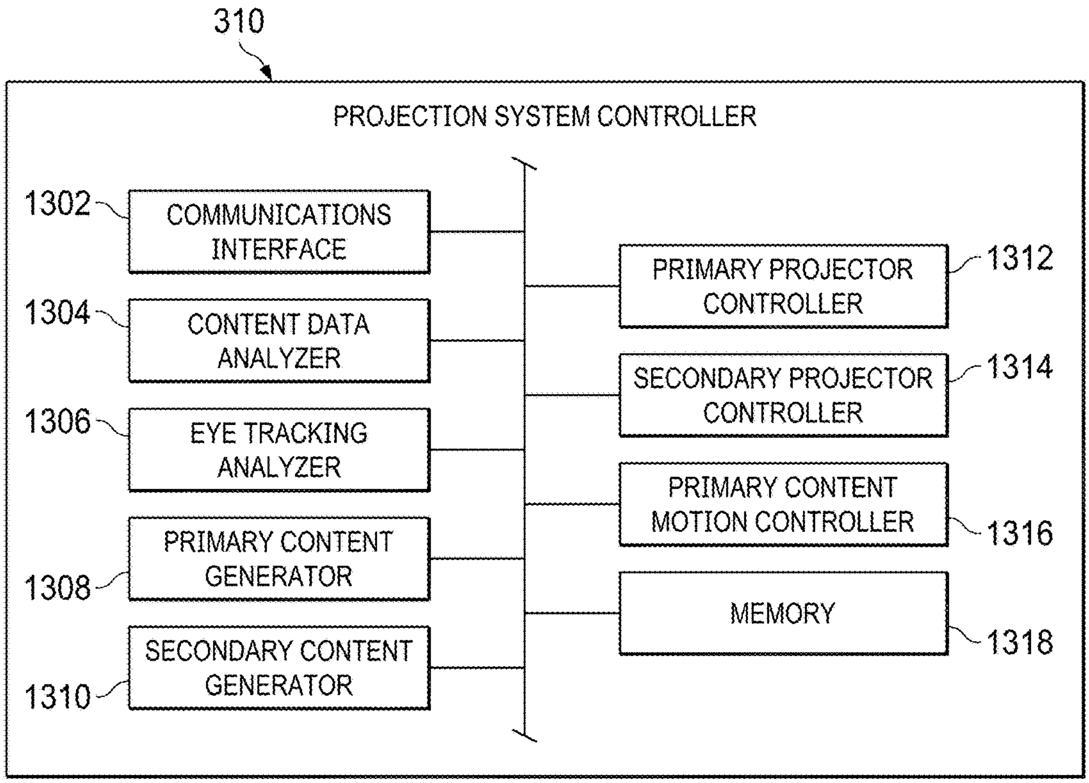
FIG. 13 is a block diagram of an example implementation of the example projection system controller of FIGS. 3 and/or 12.

FIG. 13 is a block diagram illustrating an example implementation of the projection system controller 310 of the example 3D projection systems 300, 1200 of FIGS. 3 and 12. The example projection system controller 310 of FIG. 13 includes an example communications interface 1302, an example content data analyzer 1304, an example eye tracking analyzer 1306, an example primary content generator 1308, an example secondary content generator 1310, an example primary projector controller 1312, an example secondary projector controller 1314, an example primary content motion controller 1316, and an example memory 1318.

The example communications interface 1302 of FIG. 13 receives and/or enables the access of content data to be rendered for display on the screen panel 306. In some examples, the content data received and/or accessed by the communications interface 1302 may be stored in the example memory 1318 for subsequent use and/or later retrieval. In some examples, the content data includes metadata associated with the content to be rendered that defines particular portions of the content that are to be rendered in high resolution 3D.

The example content data analyzer 1304 of FIG. 13 analyzes content to be rendered and/or associated metadata to determine what portions of the content is intended to be primary content and the corresponding location that such content is to be rendered on the screen panel. In some examples, movement of the primary content relative to the full viewing area 314 of the screen panel 306 defines the motion path followed by the region(s) of primary content rendered by the primary projector(s) 302, 1202.

The example eye tracking analyzer 1306 of FIG. 13 analyzes feedback from the one or more eye tracking sensor (s) 308 to determine a direction of gaze of a viewer and/or to determine the location on the screen panel 306 at which the viewer is looking. In some examples, the movement of a viewer's gaze defines the motion path followed by the region(s) of primary content rendered by the primary projector(s) 302, 1202. In some examples, where the motion path of the primary content is to be based on the output of the content data analyzer 1304, the eye tracking analyzer 1306 (and the one or more eye tracking sensor(s) 308) may be omitted. On the other hand, in examples where the motion path of the primary content is to be based on movement of a viewer's gaze, the content data analyzer 1304 may be omitted.

In some examples, the primary content generator 1308 of FIG. 13 determines the size and/or location of the region(s) 312, 1204 of primary content within the viewing area 314 of the screen panel 306 based on outputs of at least one of the content data analyzer 1304 and the eye tracking analyzer 1306. In some examples, the size and/or location of the region(s) 312, 1204 of primary may be determined directly by the content data analyzer 1304 and the eye tracking analyzer 1306 and then provided to the primary content generator 1308. The example primary content generator 1308 also generates or renders the particular content data to be projected from individual pixels of the primary projector (s) 302, 1202 to produce the primary content within the region(s) 312, 1204. In some examples, the rendering of the primary content by the example primary content generator 1308 includes interleaving pixel information associated with different views for a 3D image produced by the resulting light field after the projected light passes through the lens array 402. As described above, the particular pattern by which the different views are interleaved and the particular pixel information to be associated with individual pixels of the primary projector(s) 302, 1202 depends upon the location of the region(s) 312, 1204 of primary content within the viewing area 314 of the screen panel 306. Accordingly, in some examples, the primary content generator 1308 updates or recalculates the patterned rendering of the primary content in substantially real-time with the movement of the region(s) 312, 1204 of primary content.

The example secondary content generator 1310 of FIG. 13 generates or renders the particular content data to be projected from individual pixels of the secondary projector 304 to produce the secondary content displayed on the screen panel 306. In some examples, rendering the secondary content includes interleaving pixel information in a suitable pattern associated with different views for a 3D image produced by the resulting light field after the projected light passes through the lens array 402. In some examples, rather than generating a patterned rendering of the secondary content containing pixel information associated with multiple different views, the example secondary content generator 1310 may generate a unitary rendering of secondary content corresponding to a single 2D view to be displayed. In some examples, the light projected by the secondary projector 304 excludes light that would be directed toward the region(s) 312, 1204 of primary content. Accordingly, in some examples, the secondary content generator 1310 renders the secondary content for display based on the location of the region(s) 312, 1204 of primary content determined as outlined above.

Although the primary content generator 1308 and the secondary content generator 1310 are represented as separate components in the illustrated example of FIG. 13, in some examples, the primary content generator 1308 and the secondary content generator 1310 may be integrated into a single component.

The example primary projector controller 1312 of FIG. 13 controls the operation of the primary projector(s) 302, 1202. That is, the primary projector controller 1312 controls the projection of light from the primary projector(s) 302, 1202 based on the primary content generated and/or rendered by the primary content generator 1308. Although the primary content generator 1308 and the primary projector controller 1312 are represented as separate components in the illustrated example of FIG. 13, in some examples, the primary content generator 1308 and the primary projector controller 1312 may be implemented as a single component. In some examples, each primary projector 302, 1202 is controlled by a separate primary projector controller 1312. In other examples, a single primary projector controller 1312 may control the separate primary projectors 302, 1202.

The example secondary projector controller 1314 of FIG. 13 controls the operation of the secondary projector 304. That is, the secondary projector controller 1314 controls the projection of light from the secondary projector 304 based on the secondary content generated and/or rendered by the secondary content generator 1310. Although the secondary content generator 1310 and the secondary projector controller 1314 are represented as separate components in the illustrated example of FIG. 13, in some examples, the secondary content generator 1310 and the secondary projector controller 1314 may be implemented as a single component.

The example primary content motion controller 1316 of FIG. 13 controls the operation of motors and/or other mechanical actuators implemented to enable the region(s) 312, 1204 of primary content to follow a motion path within the viewing area 314 of the screen panel 306. For examples, the primary content motion controller 1316 may control one or more motors and/or other actuators associated with the linear rail 502 of FIG. 5, control one or more motors and/or other actuators associated with operation of the gimbal 602 of FIG. 6, control motors and/or actuators associated with operation of the galvo mirrors 702 of FIG. 7, and/or control the one or more actuators 802 to move the projection lens 804 of the projector 302 of FIG. 8. Although the primary projector controller 1312 and the primary content motion controller 1316 are represented as separate components in the illustrated example of FIG. 13, in some examples, the primary projector controller 1312 and the primary content motion controller 1316 may be implemented as a single component. In some examples, the movement of different regions 312, 1204 associated with different primary projectors 302, 1202 may be controlled by a separate primary content motion controller 1316. In other examples, a single primary content motion controller 1316 may control the movement of the different regions 312, 1204 associated with the separate primary projectors 302, 1202.

While an example manner of implementing the example projection system controller 310 of FIGS. 3 and/or 12 is illustrated in FIG. 13, one or more of the elements, processes and/or devices illustrated in FIG. 13 may be combined, divided, re-arranged, omitted, eliminated and/or implemented in any other way. Further, the example communications interface 1302, the example content data analyzer 1304, the example eye tracking analyzer 1306, the example primary content generator 1308, the example secondary content generator 1310, the example primary projector controller 1312, the example secondary projector controller 1314, the example primary content motion controller 1316, the example memory 1318, and/or, more generally, the example projection system controller 310 of FIGS. 3 and/or 12 may be implemented by hardware, software, firmware and/or any combination of hardware, software and/or firmware. Thus, for example, any of the example communications interface 1302, the example content data analyzer 1304, the example eye tracking analyzer 1306, the example primary content generator 1308, the example secondary content generator 1310, the example primary projector controller 1312, the example secondary projector controller 1314, the example primary content motion controller 1316, the example memory 1318 and/or, more generally, the example projection system controller 310 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communications interface 1302, the example content data analyzer 1304, the example eye tracking analyzer 1306, the example primary content generator 1308, the example secondary content generator 1310, the example primary projector controller 1312, the example secondary projector controller 1314, the example primary content motion controller 1316, and/or the example memory 1318 is/are hereby expressly defined to include a non-transitory computer readable storage device or storage disk such as a memory, a digital versatile disk (DVD), a compact disk (CD), a Blu-ray disk, etc. including the software and/or firmware. Further still, the example projection system controller 310 of FIGS. 3 and/or 12 may include one or more elements, processes and/or devices in addition to, or instead of, those illustrated in FIG. 13, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 14A:
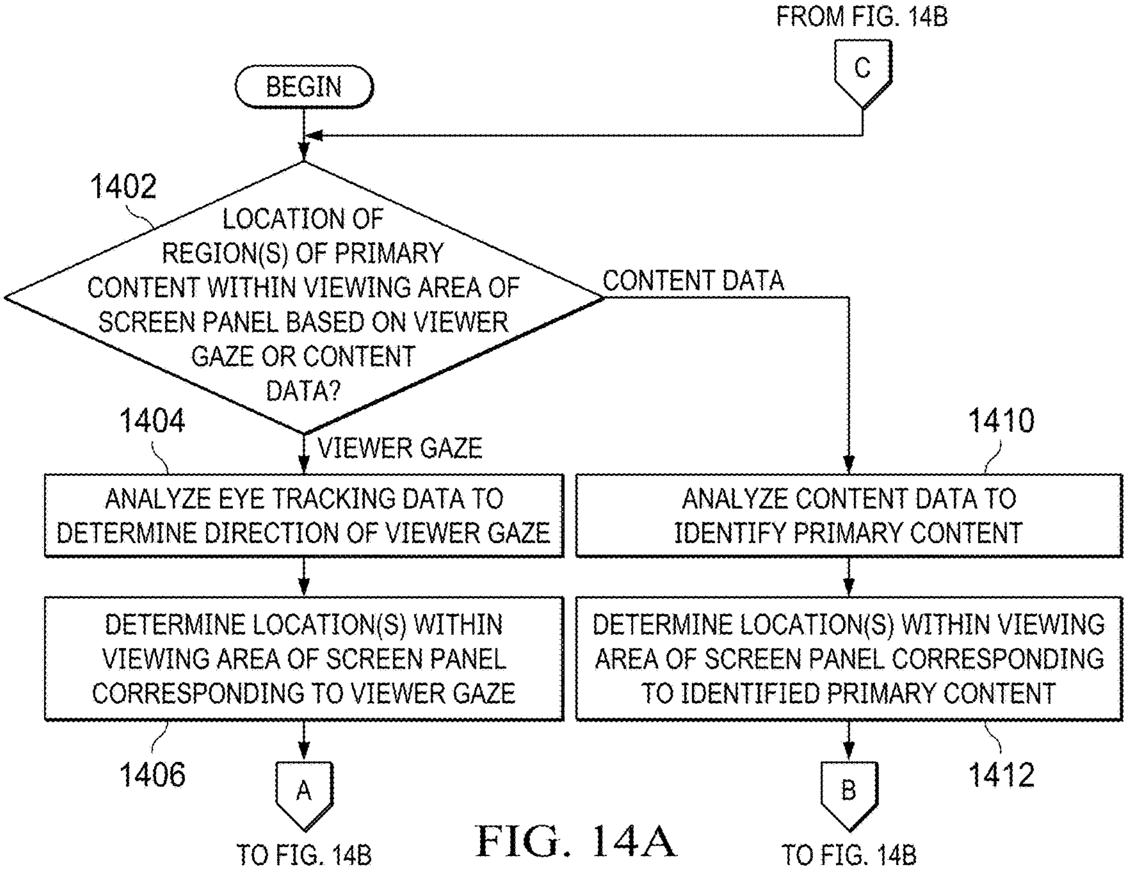
FIG. 14 (including FIGS. 14A and 14B) is a flowchart representative of example machine readable instructions that are executable to implement the example projection system controller of FIGS. 3, 12, and/or 13.
Figure 14B:
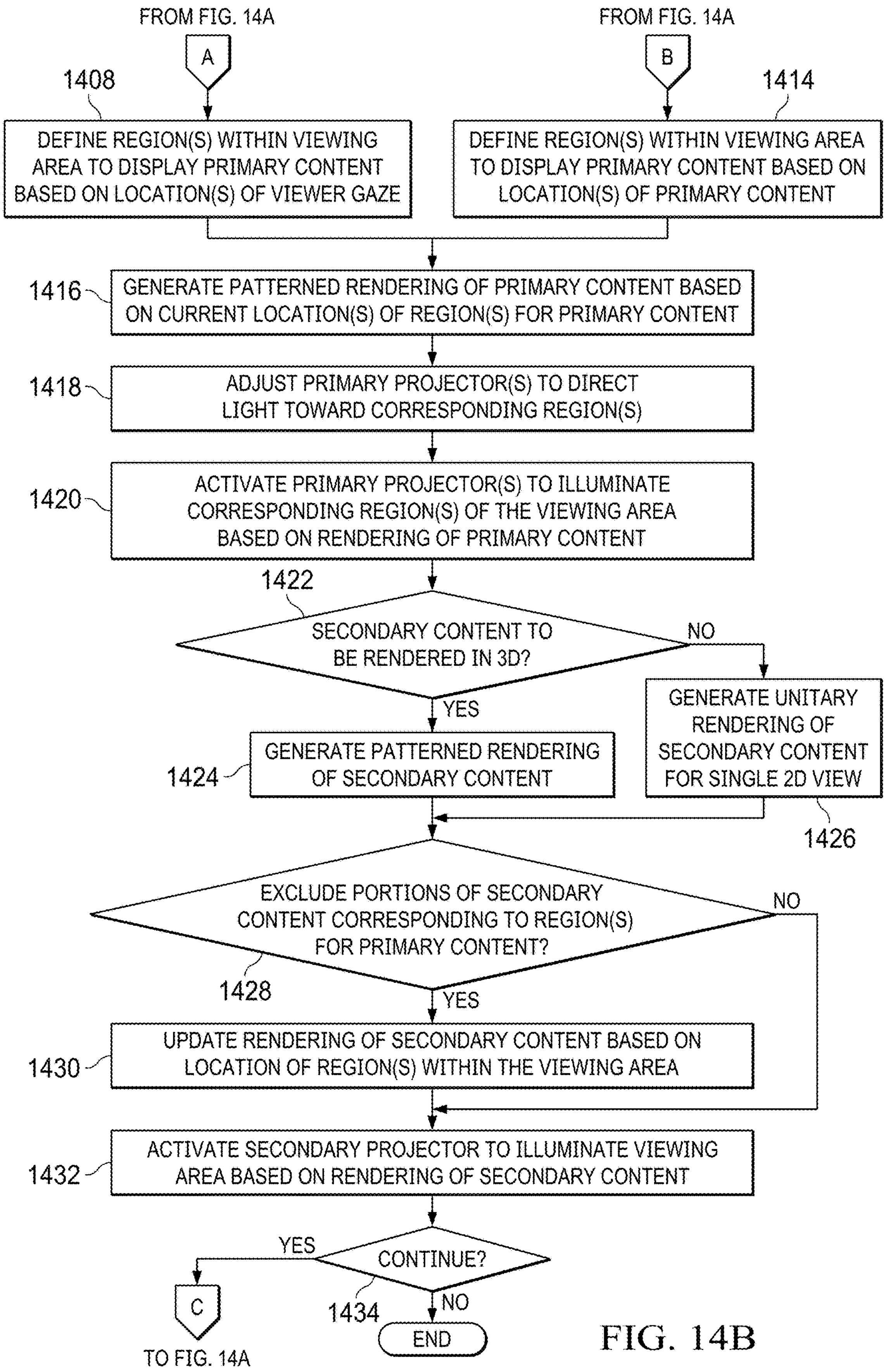

A flowchart representative of example hardware logic, machine readable instructions, hardware implemented state machines, and/or any combination thereof for implementing the example projection system controller 310 of FIGS. 3, 12, and/or 13 is shown in FIG. 14 (including FIGS. 14A and 14B). The machine readable instructions may be one or more executable programs or portion(s) of an executable program for execution by a computer processor such as the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIG. 14, many other methods of implementing the example projection system controller 310 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIG. 14 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program of FIG. 14 begins at block 1402 where the example projection system controller 310 determines whether the location of region(s) of primary content (e.g., the example regions 312, 1204) within a viewing area of a screen panel (e.g., the viewing area 314 of the screen panel 306) are to be based on a view gaze or content data. In some examples, the determination at block 1402 may be based on user input received via the communications interface 1302.

If the location of the region(s) 312, 1204 are to be based on a viewer's gaze, control advances to block 1404 where the example eye tracking analyzer 1306 analyzes eye tracking data to determine a direction of viewer gaze. In some examples, the gaze of multiple different viewers may be monitored and tracked. At block 1406, the example eye tracking analyzer 1306 determines location(s) within the viewing area 314 of the screen panel 306 corresponding to the viewer gaze. At block 1408, the example primary content generator 1308 defines the region(s) 312, 1204 within the viewing area 314 to display primary content based on the location(s) of the viewer gaze. Thereafter, control advances to block 1416.

Returning to block 1402, if the location of the region(s) 312, 1204 are to be based on content data, control advances to block 1410 where the example content data analyzer 1304 analyzes content data to identify primary content. In some examples, the content data may include the content to be rendered itself and/or metadata about such content. At block 1412, the example content data analyzer 1304 determines location(s) within the viewing area 314 of the screen panel 306 corresponding to the identified primary content. At block 1408, the example primary content generator 1308 defines the region(s) 312, 1204 to display the identified primary content based on the location(s) of the primary content. Thereafter, control advances to block 1416.

At block 1416, the example primary content generator 1308 generates a patterned rendering of the primary content based on the current location(s) of the region(s) 312, 1204 for the primary content. The patterned rendering enables multiple views of a 3D image to be produced in the light field created when the projected light passes through the lens array 402. At block 1418, the example primary content motion controller 1316 adjusts the primary projector(s) 302, 1202 to direct light toward the corresponding region(s) 312, 1204. In some examples, the primary projector(s) 302, 1202 are adjusted by moving the primary projector(s) 302, 1202 themselves (e.g., on a linear rail 502 or via a gimbal 602). In other examples, the primary projector(s) 302, 1202 are adjusted by mechanically adjusting components (e.g., the galvo mirrors 702 or the projection lens 804) affecting the direction of light emanating from the projectors. At block 1420, the example primary projector controller 1312 activates the primary projector(s) 302, 1202 to illuminate the corresponding region(s) 312, 1204 of the viewing area 314 based on the rendering of the primary content.

At block 1422, the projection system controller 310 determines whether secondary content is to be rendered in 3D. In some examples, this determination is made based on user input received via the communications interface 1302. In other examples, this determination is made by the content data analyzer 1304 analyzing content data corresponding to the content to be rendered. If the content is to be rendered in 3D, control advances to block 1424 where the example secondary content generator 1310 generates a patterned rendering of secondary content. The patterned rendering enables multiple views of a 3D image to be produced in the light field created when the projected light passes through the lens array 402. Thereafter, control advances to block 1428. Returning to block 1422, if the secondary content is not be rendered in 3D, control advances to block 1426 where the secondary content generator 1310 generates a unitary rendering of secondary content for a single 2D view. Thereafter, control advances to block 1428.

At block 1428, the example secondary content generator 1310 determines whether to exclude portions of the secondary content corresponding the region(s) 312, 1204 for the primary content. If so, control advances to block 1430 where the example secondary content generator 1310 updates the rendering of the secondary content based on the location(s) of the region(s) 312, 1204 within the viewing area 314. Thereafter, control advances to block 1432. If, at block 1428, the example secondary content generator 1310 determines not to exclude portions of the secondary content corresponding the region(s) 312, 1204 for the primary content, control advances directly to block 1432. At block 1432, the secondary projector controller 1314 activates the secondary projector 304 to illuminate the viewing area 314 based on the rendering of the secondary content. Thereafter, control advances to block 1434 where the example projection system controller 310 determines whether to continue the process. If so, control returns to block 1402. Otherwise, the example process of FIG. 14 ends.

Figure 15:
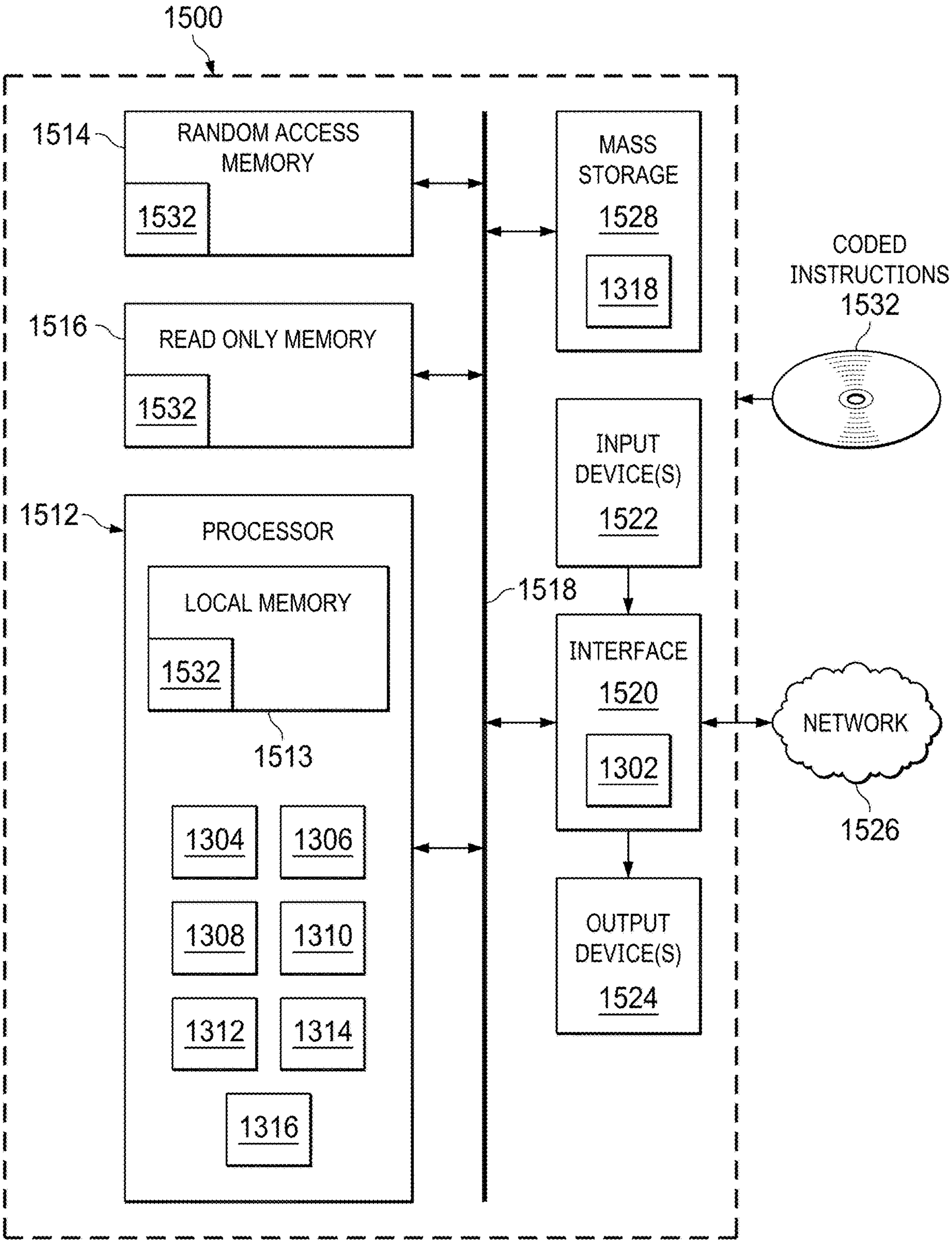
FIG. 15 is a block diagram of an example processing platform structured to execute the instructions of FIG. 14 to implement the example projection system controller of FIGS. 3, 12, and/or 13.

FIG. 15 is a block diagram of an example processor platform 1500 structured to execute the instructions of FIG. 14 to implement the projection system controller 310 of FIGS. 3, 12, and/or 13. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example content data analyzer 1304, the example eye tracking analyzer 1306, the example primary content generator 1308, the example secondary content generator 1310, the example primary projector controller 1312, the example secondary projector controller 1314, and the example primary content motion controller 1316.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface. In this example, the interface circuit implements the example communications interface 1302.

In the illustrated example, one or more input devices 1522 are connected to the interface circuit 1520. The input device (s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives. In this example, the mass storage devices 1528 include the example memory 1318.

The machine executable instructions 1532 of FIG. 14 may be stored in the mass storage device 1528, in the volatile memory 1514, in the non-volatile memory 1516, and/or on a removable non-transitory computer readable storage medium such as a CD or DVD.

From the foregoing, it will be appreciated that example methods, apparatus and articles of manufacture have been disclosed that enable lens array based autostereoscopic 3D displays with relatively high spatial resolution and relatively high angular resolution without the undue cost of implementing multiple high resolution projectors to cover an entire display screen and without the need for significant bandwidth and process capacities to handle the data processing associated with rendering multi-view 3D images for projection by multiple high resolution projections. More particularly, the bandwidth and processing requirements are reduced in accordance with teachings disclosed herein by limiting the projection of high resolution content data to relatively small regions within the total viewing area of a display screen corresponding to the main and/or intended focus of a viewer's gaze.

Example methods, apparatus, systems, and articles of manufacture to render 3D content within a moveable region of a display screen are disclosed herein. Further examples and combinations thereof include the following:

Example 1 includes an apparatus comprising a projection system controller adapted to be coupled to a light source and to be optically coupled to a screen panel, the projection system controller configured to determine a location of a region within a viewing area of the screen panel to display content, the region to be smaller than the viewing area, the location of the region to move within the viewing area to track a motion path, the content including different stereoscopic views, and activate the light source to project light corresponding to the content toward the region, the screen panel including a light redirecting surface to produce a 3D light field associated with the different stereoscopic views.

Example 2 includes the apparatus of example 1, wherein the projection system controller is configured to render the content as an interleaved pattern of the different stereoscopic views, the interleaved pattern to change based on changes to the location of the region.

Example 3 includes the apparatus of example 1, wherein projection system controller is adapted to be coupled to an eye tracking sensor, the projection system controller configured to track an eye gaze of a viewer based on feedback from the eye tracking sensor, and determine the motion path based on the eye gaze of the viewer.

Example 4 includes the apparatus of example 1, wherein the projection system controller is configured to determine the motion path based on data associated with the content.

Example 5 includes the apparatus of example 1, wherein projection system controller is adapted to be coupled to an actuator associated with the light source, the projection system controller configured to activate the actuator to move the light source relative to the screen panel based on the motion path.

Example 6 includes the apparatus of example 1, wherein the light source is a projector, the projection system controller adapted to be coupled to an actuator associated with the projector, the projection system controller configured to activate the actuator to redirect the light projected from the projector based on the motion path.

Example 7 includes the apparatus of example 1, wherein a size of the region is to be within a range of one to four times an area corresponding to a field of view of a foveal region of an eye of a viewer at an average viewer distance from the screen panel.

Example 8 includes the apparatus of example 1, wherein the light source is a first projector, the light is first light, and the region is a first region, the projection system controller adapted to be coupled to a second projector, the projection system controller configured to activate a second projector to project second light to a second region of the screen panel.

Example 9 includes the apparatus of example 8, wherein the motion path is a first motion path and the second region is smaller than the viewing area, a location of the second region to move within the viewing area to track a second motion path.

Example 10 includes the apparatus of example 9, wherein the projection system controller is configured to activate the first and second projectors at substantially a same time, the first motion path defined independent of the second motion path.

Example 11 includes the apparatus of example 9, wherein the projection system controller is configured to confine the first light projected from the first projector to a first portion of the viewing area and to confine the second light projected from the second projector to a second portion of the viewing area, the first portion being smaller than the viewing area and larger than the first region, the second portion being smaller than the viewing area and larger than the second region, the first and second motion paths corresponding to segments of a full motion path extending across both the first and second portions of the viewing area.

Example 12 includes the apparatus of example 8, wherein the second region includes substantially all of the viewing area of the screen panel outside of the first region.

Example 13 includes the apparatus of example 12, wherein the content is first content, and the projection system controller is configured to render second content for the second region, the second content corresponding to a unitary rendering of content associated with a single view of a 2D image.

Example 14 includes the apparatus of example 12, wherein the content is first content and the different stereoscopic views are first stereoscopic views, the projection system controller configured to render second content for the second region, the second content including second stereoscopic views, a first number of views corresponding to the first stereoscopic views greater than a second number of views corresponding to the second stereoscopic views.

Example 15 includes a non-transitory computer readable medium comprising instructions that, when executed, cause a processor to determine a location of a region within a viewing area of a screen panel to display content, the region to be smaller than the viewing area, the location of the region to move within the viewing area to track a motion path, the content including different stereoscopic views, and activate a light source to project light corresponding to the content toward the region, the screen panel including a light redirecting surface to produce a 3D light field associated with the different stereoscopic views.

Example 16 includes the non-transitory computer readable medium of example 15, wherein the instructions further cause the processor to render the content as an interleaved pattern of the different stereoscopic views, the interleaved pattern to change based on changes to the location of the region.

Example 17 includes the non-transitory computer readable medium of example 15, wherein the instructions further cause the processor to track an eye gaze of a viewer, and determine the motion path based on the eye gaze of the viewer.

Example 18 includes the non-transitory computer readable medium of example 15, wherein the instructions further cause the processor to determine the motion path based on data associated with the content.

Example 19 includes the non-transitory computer readable medium of example 15, wherein the instructions further cause the processor to activate an actuator to move the light source relative to the screen panel based on the motion path.

Example 20 includes the non-transitory computer readable medium of example 15, wherein the light source is a projector, the instructions to further cause the processor to activate an actuator to redirect the light projected from the projector based on the motion path.

Example 21 includes the non-transitory computer readable medium of example 15, wherein a size of the region is to be within a range of one to four times an area corresponding to a field of view of a foveal region of an eye of a viewer at an average viewer distance from the screen panel.

Example 22 includes the non-transitory computer readable medium of example 15, wherein the light source is a first projector, the light is first light, and the region is a first region, the instructions to further cause the processor to activate a second projector to project second light to a second region of the screen panel.

Example 23 includes the non-transitory computer readable medium of example 22, wherein the motion path is a first motion path and the second region is smaller than the viewing area, a location of the second region to move within the viewing area to track a second motion path.

Example 24 includes the non-transitory computer readable medium of example 23, wherein the instructions further cause the processor to activate the first and second projectors at substantially a same time, the first motion path defined independent of the second motion path.

Example 25 includes the non-transitory computer readable medium of example 23, wherein the first light projected from the first projector is to be confined to a first portion of the viewing area and the second light projected from the second projector is to be confined to a second portion of the viewing area, the first portion being smaller than the viewing area and larger than the first region, the second portion being smaller than the viewing area and larger than the second region, the first and second motion paths corresponding to segments of a full motion path extending across both the first and second portions of the viewing area.

Example 26 includes the non-transitory computer readable medium of example 22, wherein the second region includes substantially all of the viewing area of the screen panel outside of the first region.

Example 27 includes the non-transitory computer readable medium of example 26, wherein the content is first content, and the instructions further cause the processor to render second content for the second region, the second content corresponding to a unitary rendering of content associated with a single view of a 2D image.

Example 28 includes the non-transitory computer readable medium of example 26, wherein the content is first content and the different stereoscopic views being first stereoscopic views, the instructions to further cause the processor to render second content for the second region, the second content including second stereoscopic views, a first number of views corresponding to the first stereoscopic views greater than a second number of views corresponding to the second stereoscopic views.

Example 29 includes a method comprising determining, by executing an instruction with a processor, a location of a region within a viewing area of a screen panel to display content, the region to be smaller than the viewing area, the location of the region to move within the viewing area to track a motion path, the content including different stereoscopic views, and activating, by executing an instruction with the processor, a light source to project light corresponding to the content toward the region, the screen panel including a light redirecting surface to produce a 3D light field associated with the different stereoscopic views.

Example 30 includes the method of example 29, further including rendering the content as an interleaved pattern of the different stereoscopic views, the interleaved pattern to change based on changes to the location of the region.

Example 31 includes the method of example 29, further including tracking an eye gaze of a viewer, and determining the motion path based on the eye gaze of the viewer.

Example 32 includes the method of example 29, further including determining the motion path based on data associated with the content.

Example 33 includes the method of example 29, further including activating an actuator to move the light source relative to the screen panel based on the motion path.

Example 34 includes the method of example 29, wherein the light source is a projector, the method further including activating an actuator to redirect the light projected from the projector based on the motion path.

Example 35 includes the method of example 29, wherein a size of the region is to be within a range of one to four times an area corresponding to a field of view of a foveal region of an eye of a viewer at an average viewer distance from the screen panel.

Example 36 includes the method of example 29, wherein the light source is a first projector, the light is first light, and the region is a first region, the method further including activating a second projector to project second light to a second region of the screen panel.

Example 37 includes the method of example 36, wherein the motion path is a first motion path and the second region is smaller than the viewing area, a location of the second region to move within the viewing area to track a second motion path.

Example 38 includes the method of example 37, further including activating the first and second projectors at substantially a same time, the first motion path defined independent of the second motion path.

Example 39 includes the method of example 37, wherein the first light projected from the first projector is to be confined to a first portion of the viewing area and the second light projected from the second projector is to be confined to a second portion of the viewing area, the first portion being smaller than the viewing area and larger than the first region, the second portion being smaller than the viewing area and larger than the second region, the first and second motion paths corresponding to segments of a full motion path extending across both the first and second portions of the viewing area.

Example 40 includes the method of example 36, wherein the second region includes substantially all of the viewing area of the screen panel outside of the first region.

Example 41 includes the method of example 40, wherein the content is first content, the method further including rendering second content for the second region, the second content corresponding to a unitary rendering of content associated with a single view of a 2D image.

Example 42 includes the method of example 40, wherein the content is first content and the different stereoscopic views being first stereoscopic views, the method further including rendering second content for the second region, the second content including second stereoscopic views, a first number of views corresponding to the first stereoscopic views greater than a second number of views corresponding to the second stereoscopic views.

Example 43 includes an apparatus comprising a panel including a light redirecting surface to produce a 3D light field, the panel having a viewing area, and a light source to illuminate a region of the viewing area of the panel, the region smaller than the viewing area, a location of the region to move within the viewing area to track a motion path.

Example 44 includes the apparatus of example 43, further including an eye tracking system to track an eye gaze of a viewer, the motion path corresponding to the eye gaze of the viewer.

Example 45 includes the apparatus of example 43, wherein the motion path is defined by data associated with content to be displayed on the panel with the light.

Example 46 includes the apparatus of example 43, wherein the light source is a projector, the location of the region to move according to the motion path based on movement of a projection lens of the projector.

Example 47 includes the apparatus of example 43, further including a linear rail to support the light source, the location of the region to move according to the motion path based on movement of the light source along the linear rail.

Example 48 includes the apparatus of example 43, wherein the light source is a projector, the apparatus further including a gimbal to support the projector, the location of the region to move according to the motion path based on movement of the projector with the gimbal.

Example 49 includes the apparatus of example 43, wherein the light source is a projector, the apparatus further including a galvo scanning mirror to reflect the light from the projector to the panel, the location of the region to move based on movement of the galvo scanning mirror.

Example 50 includes the apparatus of example 43, wherein a size of the region is to be within a range of one to four times an area corresponding to a field of view of a foveal region of an eye of a viewer at an average viewer distance from the panel.

Example 51 includes the apparatus of example 43, wherein the light source is a first projector, the light is first light, and the region is a first region, the apparatus further including a second projector to project second light to a second region of the panel.

Example 52 includes the apparatus of example 51, wherein the motion path is a first motion path, the second region to be smaller than the viewing area, a location of the second region to move within the viewing area based on a second motion path.

Example 53 includes the apparatus of example 52, wherein the first projector is to project the first light at substantially a same time as the second projector is to project the second light, the first motion path defined independent of the second motion path.

Example 54 includes the apparatus of example 52, wherein the first light from the first projector is limited to a first portion of the viewing area and second light from the second projector is limited to a second portion of the viewing area, the first portion smaller than the viewing area and larger than the first region, the second portion smaller than the viewing area and larger than the second region, the first and second motion paths corresponding to segments of a full motion path across both the first and second portions of the viewing area.

Example 55 includes the apparatus of example 51, wherein the second region includes substantially all of the viewing area of the panel outside of the first region.

Example 56 includes the apparatus of example 55, wherein the first light is to produce a 3D image within the first region, the second light is to produce a 2D image within the second region.

Example 57 includes the apparatus of example 55, wherein the first light is to produce a first 3D image within the first region, the second light is to produce a second 3D image in the second region, the first 3D image associated with a higher angular resolution than the second 3D image.

Example 58 includes the apparatus of example 55, wherein the first region is associated with a first pixel density and the second region is associated with a second pixel density, the first pixel density higher than the second pixel density.

Example 59 includes the apparatus of example 43, wherein the light source is a flat panel display.

Example 60 includes the apparatus of example 43, wherein the light source is a projector, a size of the region to vary based on an adjustment in at least one of a distance of the projector from the panel or a magnification of a lens of the projector.

Example 61 includes the apparatus of example 43, wherein the light redirecting surface is a lens array.

Example 62 includes the apparatus of example 61, wherein the lens array is a lenticular lens array.

Example 63 includes the apparatus of example 61, wherein the lens array is a spherical lens array.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:

projecting, by a first projector, a first image to a first region, the first image having a first angular resolution and a first number of views; and projecting, by a second projector, a second image to a second region, the second image having a second angular resolution and a second number of views, wherein the second region is within the first region, the second angular resolution is greater than the first angular resolution, and the second number of views is greater than the first number of views.

2. The method of claim 1, wherein the second number of views is greater than one and the first number of views is one.

3. The method of claim 1, wherein the first number of views is greater than one and the second number of views is greater than one.

4. The method of claim 1, further comprising projecting, by a third projector, a third image to a third region, wherein the third region is a subset of the first region.

5. The method of claim 1, wherein projecting the first image comprises projecting the first image in the second region.

6. The method of claim 1, wherein projecting the first image comprises projecting the first image in at least a portion of the second region.

7. The method of claim 1, further comprising:

instructing, by a controller, the first projector to project first content in the first region; and instructing, by the controller, the second projector to project second content in the second region.

8. An apparatus comprising:

a controller, the controller configured to:

produce a first image based on first content; and produce a second image based on second content;

a first projector coupled to the controller, the first projector configured to project the first image to a first region, the first image having a first angular resolution and a first number of views; and a second projector coupled to the controller, the second projector configured to project the second image to a second region, the second image having a second angular resolution and a second number of views, wherein the second region is within the first region, the second angular resolution is greater than the first angular resolution, and the second number of views is greater than the first number of views.

9. The apparatus of claim 8, further comprising a lens array and a screen panel optically coupled to the first projector and to the second projector.

10. The apparatus of claim 8, further comprising a diffractive film or metalenses optically coupled to the first projector and to the second projector.

11. The apparatus of claim 8, wherein the second number of views is greater than one and the first number of views is one.

12. The apparatus of claim 8, wherein the first number of views is greater than one and the second number of views is greater than one.

13. The apparatus of claim 8, wherein a size of the second region is a quarter or less than a size of the first region.

14. The apparatus of claim 8, further comprising a third projector coupled to the controller, the third projector configured to project a third image to a third region, wherein the third region is a subset of the first region.

15. The apparatus of claim 8, wherein the first projector is configured to project the first image in the second region.

16. The apparatus of claim 8, wherein the first projector is configured to not project the first image in at least a portion of the second region.

17. A method comprising:

determining, by a controller, a first region of a display;

instructing, by the controller, the display to display first content in the first region as a first image having a first angular resolution and a first number of views;

determining, by the controller, a second region of the display, the second region different than the first region; and instructing, by the controller, the display to display second content in the second region as a second image having a second angular resolution a second number of views, the second angular resolution greater than the first angular resolution and the second number of views greater than the first number of views.

18. The method of claim 17, further comprising selecting the first region based on the first content.

19. The method of claim 17, further comprising selecting the first region based on metadata associated with the first content.

20. The method of claim 17, further comprising selecting the first region based on a detected gaze.

* * * * *